US012278044B2

(12) United States Patent
Liu et al.

(10) Patent No.: US 12,278,044 B2
(45) Date of Patent: Apr. 15, 2025

(54) METHOD FOR PREPARING ANISOTROPIC FLAKE NANOCRYSTALLINE RARE EARTH PERMANENT MAGNET MATERIAL AND RARE EARTH PERMANENT MAGNET MATERIAL

(71) Applicant: SICHUAN UNIVERSITY, Sichuan (CN)

(72) Inventors: Ying Liu, Sichuan (CN); Renquan Wang, Sichuan (CN); Jun Li, Sichuan (CN); Hongxing Chen, Sichuan (CN); Yao Xiao, Sichuan (CN)

(73) Assignee: SICHUAN UNIVERSITY, Sichuan (CN)

( * ) Notice: Subject to any disclaimer, the term of this patent is extended or adjusted under 35 U.S.C. 154(b) by 0 days.

(21) Appl. No.: 18/713,575

(22) PCT Filed: Nov. 24, 2023

(86) PCT No.: PCT/CN2023/133993
§ 371 (c)(1),
(2) Date: May 24, 2024

(87) PCT Pub. No.: WO2024/109932
PCT Pub. Date: May 30, 2024

(65) Prior Publication Data

US 2024/0331937 A1 Oct. 3, 2024

(30) Foreign Application Priority Data

Nov. 25, 2022 (CN) ........................ 202211487970.X

(51) Int. Cl.
*H01F 41/02* (2006.01)
*B22F 3/24* (2006.01)
(Continued)

(52) U.S. Cl.
CPC ....... *H01F 41/0266* (2013.01); *C22C 38/005* (2013.01); *H01F 1/0576* (2013.01)

(58) Field of Classification Search
None
See application file for complete search history.

(56) References Cited

U.S. PATENT DOCUMENTS

2006/0005898 A1* 1/2006 Liu ......................... H01F 1/058 148/105
2012/0019342 A1* 1/2012 Gabay ................... B22F 1/0551 419/33
2014/0238553 A1* 8/2014 Sakuma .................... B22F 9/06 148/513

FOREIGN PATENT DOCUMENTS

CN 101174499 A 5/2008
CN 102436887 A 5/2012
(Continued)

OTHER PUBLICATIONS

Rong, Journal of Applied Physics, vol. 107, No. 09A717. (Year: 2010).*
(Continued)

*Primary Examiner* — Xiaowei Su
(74) *Attorney, Agent, or Firm* — Bryan D. Zerhusen, Esq.; Nicholas R. Herrel, Esq.; CANTOR COLBURN LLP

(57) ABSTRACT

Disclosed are a method for preparing an anisotropic flake nanocrystalline rare earth permanent magnet material and a rare earth permanent magnet material. In the disclosure, the method includes: step 1, preparation of a precursor flake nanocrystal magnetic powder, where a number of grains of flake nanocrystals inside the precursor flake nanocrystalline magnetic powder accounts for not less than 85% of a total number of grains inside the precursor flake nanocrystalline magnetic powder; step 2, orientation treatment by hot defor-
(Continued)

mation: subjecting the precursor flake nanocrystalline magnetic powder or a green body prepared from the precursor flake nanocrystalline magnetic powder to the hot deformation, such that flake nanocrystals are regularly arranged; and step 3, post-processing for optimizing orientation.

11 Claims, 9 Drawing Sheets

(51) Int. Cl.
*C22C 38/00* (2006.01)
*H01F 1/057* (2006.01)

(56) References Cited

FOREIGN PATENT DOCUMENTS

| | | | |
|---|---|---|---|
| CN | 103875044 | A | 6/2014 |
| CN | 108231311 | A | 6/2018 |
| CN | 108428541 | A | 8/2018 |
| CN | 115762942 | A | 3/2023 |
| JP | 2012023197 | A | 2/2012 |
| JP | 2014063850 | A | 4/2014 |

OTHER PUBLICATIONS

Machine translation of CN108428541A. (Year: 2018).*
International Search Report and Translation for PCT/CN2023/133993 dated Feb. 3, 2024.

* cited by examiner

METHOD FOR PREPARING ANISOTROPIC FLAKE NANOCRYSTALLINE RARE EARTH PERMANENT MAGNET MATERIAL AND RARE EARTH PERMANENT MAGNET MATERIAL

CROSS-REFERENCE TO RELATED APPLICATIONS

This application is a national stage application of International Patent Application No. PCT/CN2023/133993, filed on Nov. 24, 2023, which claims priority to, and the benefit of, the Chinese Patent Application No. CN202211487970.X, filed with the China National Intellectual Property Administration (CNIPA) on Nov. 25, 2022, and entitled "METHOD FOR PREPARING ANISOTROPIC FLAKE NANOCRYSTALLINE RARE EARTH PERMANENT MAGNET MATERIAL AND RARE EARTH PERMANENT MAGNET MATERIAL". The disclosure of the two patent applications is incorporated by references in their entireties.

TECHNICAL FIELD

The present disclosure relates to the technical field of rare earth permanent magnet materials, and in particular to a method for preparing an anisotropic flake nanocrystalline rare earth permanent magnet material and a rare earth permanent magnet material.

BACKGROUND

RE-Fe—B rare earth permanent magnet materials have become an important foundation for the development of industries such as high-tech and clean energy due to their excellent magnetic properties, and serve as indispensable functional materials in supporting the implementation of Chinese national strategies such as "Made in China 2025" and "Internet+".

The $RE_2Fe_{14}B$ phase in the RE-Fe—B rare earth permanent magnet material has a tetragonal structure and shows strong uniaxial anisotropy. Ideally, the magnetic properties of anisotropic permanent magnet materials are twice those of isotropic permanent magnet materials. Anisotropic permanent magnet materials include anisotropic powder materials and anisotropic bulk materials. The anisotropic powder material can be oriented and arranged in an adhesive under the action of a magnetic field force or mechanical force, thereby preparing an anisotropic bonded bulk material. In addition to directly from the anisotropic powder materials, the anisotropic bulk material can also be prepared from isotropic powder materials through hot deformation, which causes $RE_2Fe_{14}B$ grains to undergo dissolution and precipitation to allow preferential growth, thereby forming an oriented texture to achieve anisotropy. It can be seen that an orientation degree of anisotropic permanent magnet materials is a key determinant of the magnetic properties of the materials.

Chinese patent No. 200610147137.5 provided a preparation method of an anisotropic nanocrystalline rare earth permanent magnet magnetic powder. By conducting hot rolling on a rapid-quenching magnetic powder, the rapid-quenching magnetic powder is plastically deformed, thereby forming an oriented texture. Due to a short hot rolling time, the magnetic powder shows a poor orientation degree, and the hot rolling is conducted twice to improve the orientation degree. However, a large amount of residual stress may inevitably be generated in the powder after repeated hot rolling. As a result, the prepared magnetic powder shows a poor coercivity (10.7 kOe), and the magnetic properties need to be improved. Chinese patent No. 201110428088.3 provided an anisotropic nanocrystalline composite permanent magnet material and a preparation method thereof. A nanocrystalline magnetic powder is prepared by rapid quenching or mechanical alloying, and an anisotropic magnet is prepared by hot pressing and hot deformation. After crushing, a rare earth-rich phase in the magnet is removed by acid etching to obtain anisotropic flake grains. A surface of the anisotropic flake grains is coated or cladded with a soft magnetic phase to obtain nanocomposite flake grains. The nanocomposite flake grains are prepared into a full-density anisotropic nanocrystalline composite magnetic material by hot pressing, with a magnetic energy product reaching not less than 42 MGOe. However, the preparation method has a complex process that is difficult to control, a long production cycle, and a poor production efficiency, and is not conducive to large-scale industrial promotion.

Therefore, there is an urgent need to develop a preparation method of an anisotropic rare earth permanent magnet material, thus enhancing magnetic properties of the anisotropic rare earth permanent magnet material while simplifying the process and improving a production efficiency.

SUMMARY

An object of the present disclosure is to provide a method for preparing an anisotropic flake nanocrystalline rare earth permanent magnet material and a rare earth permanent magnet material. The present disclosure is intended to enhance magnetic properties of the anisotropic rare earth permanent magnet material while simplifying a process and improving a production efficiency.

In a first aspect, the present disclosure provides a method for preparing an anisotropic flake nanocrystalline rare earth permanent magnet material, including the following steps:

- step 1, preparation of a precursor flake nanocrystalline magnetic powder: subjecting a magnetic powder of a rare earth permanent magnet to heat preservation at a temperature of 710° C. to 740° C. for 5 min to 120 min under vacuum or a protective atmosphere to obtain the precursor flake nanocrystalline magnetic powder, where the magnetic powder of the rare earth permanent magnet is one selected from the group consisting of a nanocrystalline magnetic powder and an amorphous magnetic powder, and the nanocrystalline magnetic powder has an average grain size of not more than 200 nm: a number of grains of flake nanocrystals inside the precursor flake nanocrystalline magnetic powder accounts for not less than 85% of a total number of grains inside the precursor flake nanocrystalline magnetic powder; and the flake nanocrystals have an average grain size of 10 nm to 300 nm in a grain thickness direction and an average grain size of 30 nm to 800 nm in a grain length direction;
- step 2, orientation treatment by hot deformation: subjecting the precursor flake nanocrystalline magnetic powder or a package or a green body prepared from the precursor flake nanocrystalline magnetic powder to hot deformation at a temperature of 500° C. to 850° C., such that the flake nanocrystals are regularly arranged to obtain an oriented flake nanocrystalline rare earth permanent magnet material; and
- step 3, post-processing for optimizing orientation: subjecting the oriented flake nanocrystalline rare earth permanent magnet material to heat preservation at a temperature of 600° C. to 850° C. for 3 min to 120 min under vacuum or a protective atmosphere to obtain the anisotropic flake nanocrystalline rare earth permanent magnet material.

In some embodiments, the magnetic powder of the rare earth permanent magnet has a nominal composition of $RE_xFe_{100-x-y-z}TM_yB_z$, where RE is one or more selected from the group consisting of La, Ce, Pr, Nd, Y, Dy, and Tb, TM is one or more selected from the group consisting of Co, Zr, Cr, V, Nb, Si, Ti, Mo, Mn, W, Ga, Cu, Al, and Zn, and x, y, and z each represent a mass fraction of an element, and $26.0 \le x \le 36.0$, $0.14 \le y \le 8.0$, and $0.8 \le z \le 1.36$.

In some embodiments, the preparation of the precursor flake nanocrystalline magnetic powder in step 1 is conducted by subjecting the magnetic powder of the rare earth permanent magnet to the heat preservation at the temperature of 710° C. to 740° C. for 5 min to 100 min under vacuum or the protective atmosphere to obtain the precursor flake nanocrystalline magnetic powder, where the number of the grains of the flake nanocrystals inside the precursor flake nanocrystalline magnetic powder accounts for not less than 85% of the total number of the grains inside the precursor flake nanocrystalline magnetic powder; and the flake nanocrystals have the average grain size of 50 nm to 150 nm in the grain thickness direction and the average grain size of 150 nm to 600 nm in the grain length direction.

In some embodiments, the preparation of the precursor flake nanocrystalline magnetic powder in step 1 is conducted by subjecting the magnetic powder of the rare earth permanent magnet to the heat preservation at the temperature of 710° C. to 740° C. for 15 min to 60 min under vacuum or the protective atmosphere to obtain the precursor flake nanocrystalline magnetic powder, where the number of the grains of the flake nanocrystals inside the precursor flake nanocrystalline magnetic powder accounts for not less than 85% of the total number of the grains inside the precursor flake nanocrystalline magnetic powder; and the flake nanocrystals have the average grain size of 60 nm to 100 nm in the grain thickness direction and the average grain size of 180 nm to 400 nm in the grain length direction.

In some embodiments, the hot deformation in the orientation treatment by the hot deformation in step 2 is conducted by one or more selected from the group consisting of hot rolling deformation, hot pressing deformation, and hot extrusion deformation.

In some embodiments, the hot rolling deformation is conducted by subjecting the precursor flake nanocrystalline magnetic powder to the hot rolling deformation under vacuum or a protective atmosphere at a temperature of 600° C. to 850° C. with a deformation amount of 50% to 90% in a thickness direction of the precursor flake nanocrystalline magnetic powder, such that the flake nanocrystals are regularly arranged.

In some embodiments, the hot pressing deformation is conducted by vacuum packaging the precursor flake nanocrystalline magnetic powder with a packaging material to obtain the package, and subjecting the package to the hot pressing deformation at a temperature of 600° C. to 850° C. with a deformation rate of 0.02 mm/s to 3 mm/s and a deformation amount of the package of 50% to 90% in a hot pressing direction, such that the flake nanocrystals are regularly arranged.

In some embodiments, the hot pressing deformation is conducted by preparing the precursor flake nanocrystalline magnetic powder into a green body with a density of 65.0% to 99.9% at a temperature of room temperature to 800° C., and subjecting the green body to the hot pressing deformation at a temperature of 600° C. to 850° C. with a deformation rate of 0.02 mm/s to 3 mm/s and a deformation amount of the green body of 50% to 90% in a hot pressing direction, such that the flake nanocrystals are regularly arranged.

In some embodiments, the hot extrusion deformation is conducted by preparing the precursor flake nanocrystalline magnetic powder into a green body with a density of 65.0% to 99.9% at a temperature of room temperature to 800° C., and subjecting the green body to the hot extrusion deformation at a temperature of 600° C. to 850° C. with a deformation rate of 0.02 mm/s to 3 mm/s, such that the flake nanocrystals are regularly arranged.

In a second aspect, the present disclosure provides an anisotropic flake nanocrystalline rare earth permanent magnet material prepared by the above method for preparing an anisotropic flake nanocrystalline rare earth permanent magnet material.

To sum up, the present disclosure has at least one of the following beneficial effects:

1. In the method for preparing an anisotropic flake nanocrystalline rare earth permanent magnet material of the present disclosure, the precursor flake nanocrystalline magnetic powder is prepared by the preparation of the precursor flake nanocrystalline magnetic powder of step 1. The number of the grains of the flake nanocrystals inside the precursor flake nanocrystalline magnetic powder accounts for not less than 85% of the total number of the grains inside the precursor flake nanocrystalline magnetic powder; and the flake nanocrystals have an average grain size of 10 nm to 300 nm in the grain thickness direction and an average grain size of 30 nm to 800 nm in the grain length direction. During the subsequent hot deformation of the precursor flake nanocrystalline magnetic powder, the flake nanocrystals with a specific structure have shape anisotropy and thus can easily rotate under the action of a stress field, driving a thickness of the flake nanocrystal to be regularly arranged along the direction of hot deformation, and then forming an oriented texture and improving the orientation degree, thereby obtaining the anisotropic rare earth permanent magnet material with a high performance. where $B_r$ can reach not less than 14.1 kGs, $H_{cj}$ can reach not less than 13.2 kOe, and $(BH)_{max}$ can reach not less than 45.7 MGOe. In some embodiments, $B_r$ can reach not less than 14.2 kGs, $H_{cj}$ can reach not less than 13.8 kOe, and $(BH)_{max}$ can reach not less than 47.1 MGOe. In some embodiments, $B_r$ can reach 14.4 kGs and $(BH)_{max}$ can reach 48.1 MGOe.
2. In the method for preparing an anisotropic flake nanocrystal rare earth permanent magnet material of the present disclosure, due to the prone rotation and orientation of the flake nanocrystals of the precursor flake nanocrystalline magnetic powder, on one hand, a conventional slow deformation process, such as a hot deformation rate of 0.1 mm/s, can be used in the orientation by hot deformation of step 2, and could result in a high degree of orientation, and higher remanence and maximum energy product. On the other hand, since the flake nanocrystal is prone to rotate and orient, unlike equiaxed crystals or amorphous crystals, which need to undergo dissolution and precipitation to be oriented during hot deformation, an excellent oriented texture can be obtained in an extremely short hot deformation time. In this way, a production efficiency of the anisotropic rare earth permanent magnet material is improved, and high magnetic properties can still be obtained at a hot deformation rate of not less than 0.8 mm/s.

3. In the method for preparing an anisotropic flake nanocrystalline rare earth permanent magnet material of the present disclosure, specific preparation of a precursor flake nanocrystalline magnetic powder in step 1, orientation treatment by hot deformation in step 2, and post-processing for optimizing orientation in step 3 are adopted, the prepared flake nanocrystal is oriented through hot deformation and subjected to optimization orientation. The above three steps work synergistically to jointly improve the magnetic properties of the anisotropic flake nanocrystalline rare earth permanent magnet material.
4. The method for preparing an anisotropic flake nanocrystalline rare earth permanent magnet material of the present disclosure has a simple process, strong controllability, and high production efficiency. The obtained anisotropic flake nanocrystalline rare earth permanent magnet material has excellent performance and is suitable for industrial mass production.

DETAILED DESCRIPTION OF THE EMBODIMENTS

Figure 1A:
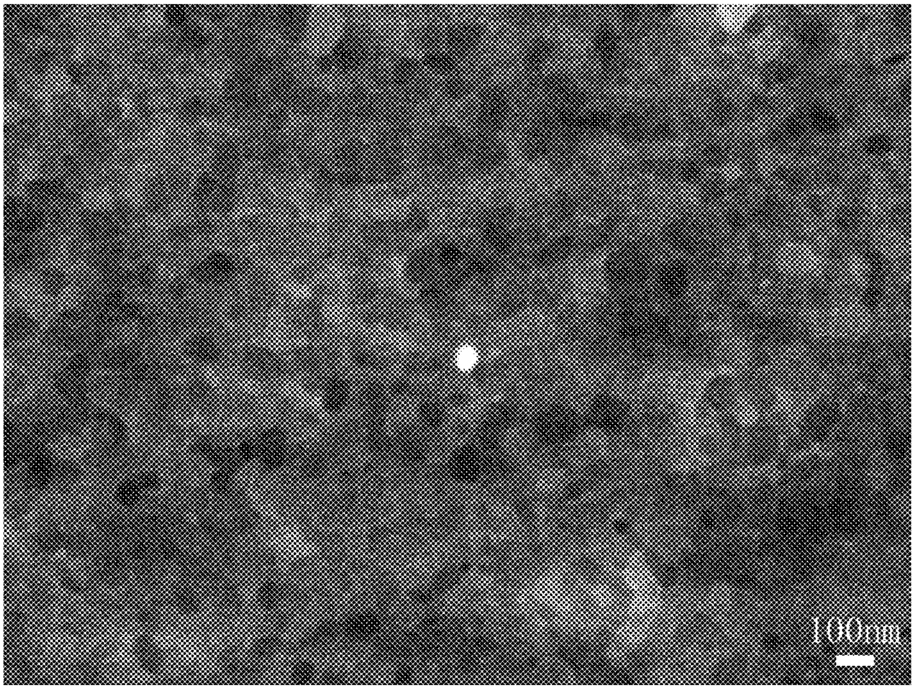
FIG. 1A shows a scanning electron microscopy (SEM) image of the nanocrystalline rapid-quenching magnetic powder in Example 1 of the present disclosure.

The present disclosure provides a method for preparing an anisotropic flake nanocrystalline rare earth permanent magnet material and a rare earth permanent magnet material. To make the objects, technical solutions, and effects of the present disclosure clear, the following further describes the present disclosure in detail. It should be understood that the specific embodiments described herein are only intended to explain the present disclosure and are not intended to limit the present disclosure.

A $RE_2Fe_{14}B$ phase in the RE-Fe—B rare earth permanent magnet material has a tetragonal structure and shows strong uniaxial anisotropy. Ideally, the magnetic properties of anisotropic permanent magnet materials are twice those of isotropic permanent magnet materials. Dense anisotropic RE-Fe—B permanent magnets can be divided into sintered magnets and hot deformation magnets according to the preparation method. Compared with sintered magnets with a micron crystal structure, the hot deformation magnets have a unique nanocrystalline structure and rich grain boundary structure, achieving higher magnetic properties without using medium and heavy rare earths. This type of magnet is considered to be the most promising rare earth permanent magnet material. The anisotropy of hot deformation magnets comes from the dissolution and precipitation of $RE_2Fe_{14}B$ grains under the action of temperature field and stress field, forming flake structure grains regularly arranged along the direction of hot deformation and then obtaining an oriented texture. The formation of the oriented texture is mainly through the dissolution and precipitation of $RE_2Fe_{14}B$ grains under the action of temperature field and stress field. The precursors used in conventional hot deformation methods are generally amorphous or equiaxed nanocrystalline magnetic powders. These precursor powders require a long enough time for the $RE_2Fe_{14}B$ grains to dissolve, precipitate, and preferentially grow to form an oriented texture. Therefore, there is an extremely poor deformation rate of conventional processes, generally less than 0.2 mm/s, which greatly limits the production efficiency of hot deformation-based magnets. In terms of preparation of anisotropic RE-Fe—B magnetic powder, the traditional preparation methods of anisotropic magnetic powder mainly include anisotropic hot deformation magnet crushing, hydrogenation-disproportionation-desorption-recombination (HDDR), and mechanical ball milling, which are time-consuming and complicated. In addition, the magnetic powder prepared by these methods is basically irregular in shape, and an oriented magnetic field is required in subsequent molding to obtain anisotropic bonded magnets, thus greatly increasing the preparation cost. After long-term experimental research, the applicant has surprisingly found that nanocrystalline magnetic powder or amorphous magnetic powder can be used to prepare precursor flake nanocrystalline magnetic powder with a specific structure through a specific preparation process. The number of grains of flake nanocrystals inside the precursor flake nanocrystalline magnetic powder accounts for not less than 85% of a total number of grains inside the precursor flake nanocrystalline magnetic powder. Since the flake nanocrystals with a specific structure show shape anisotropy, it can easily rotate under the action of the subsequent hot deformation stress field, forming an oriented texture in which the flake nanocrystals are regularly arranged in a way that the thickness direction of the flake nanocrystals are parallel to the direction of the hot deformation, thereby increasing an orientation degree. Furthermore, by optimizing the orientation through post-processing in a specific process, the anisotropic rare earth permanent magnet material is obtained with excellent magnetic properties. The present disclosure is proposed on the basis of this research.

In the present disclosure, the magnetic powder of the rare earth permanent magnet has a nominal composition of $RE_xFe_{100-x-y-z}TM_yB_z$, where RE is one or more selected from the group consisting of La, Ce, Pr, Nd, Y, Dy, and Tb, TM is one or more selected from the group consisting of Co, Zr, Cr, V, Nb, Si, Ti, Mo, Mn, W, Ga, Cu, Al, and Zn, and x, y, and z each represent a mass fraction of an element, and $26.0 \leq x \leq 36.0$, $0.14 \leq y \leq 8.0$, and $0.8 \leq z \leq 1.36$. Rare earth permanent magnet materials with better magnetic properties can be prepared by using the magnetic powder of the rare earth permanent magnet with the above formula. The magnetic powder of the rare earth permanent magnet is one or more selected from the group consisting of a rapid-quenching magnetic powder, an HDDR magnetic powder, a ball milling magnetic powder, a mechanical crushing magnetic powder, and a mechanical alloying magnetic powder.

The present disclosure provides a method for preparing an anisotropic flake nanocrystalline rare earth permanent magnet material, including the following steps:

Step 1, preparation of a precursor flake nanocrystalline magnetic powder: subjecting a magnetic powder of a rare earth permanent magnet to heat preservation at a temperature of 710° C. to 740° C. for 5 min to 120 min under vacuum or a protective atmosphere to obtain the precursor flake nanocrystalline magnetic powder, where the magnetic powder of the rare earth permanent magnet is one selected from the group consisting of a nanocrystalline magnetic powder and an amorphous magnetic powder, and the nanocrystalline magnetic powder has an average grain size of not more than 200 nm: a number of grains of flake nanocrystals inside the precursor flake nanocrystalline magnetic powder accounts for not less than 85% of a total number of grains inside the precursor flake nanocrystalline magnetic powder; and the flake nanocrystals have an average grain size of 10 nm to 300 nm in a grain thickness direction and an average grain size of 30 nm to 800 nm in a grain length direction.

The nanocrystalline magnetic powder or amorphous magnetic powder is prepared into the precursor flake nanocrystalline magnetic powder with a specific flake nanocrystal structure through the above-mentioned specific preparation process. The number of grains of a flake nanocrystal inside the precursor flake nanocrystalline magnetic powder accounts for not less than 85% of a total number of grains inside the precursor flake nanocrystalline magnetic powder. Since the flake nanocrystal shows shape anisotropy, it can easily rotate under the action of stress field, forming an oriented texture in which the flake nanocrystals are regularly arranged in a way that a thickness direction of the flake nanocrystals is parallel to a direction of hot deformation. On one hand, the flake nanocrystal of the precursor flake nanocrystalline magnetic powder is prone to rotate and orient, and anisotropic permanent magnet materials with excellent magnetic properties can be prepared under conventional hot deformation rates. On the other hand, the anisotropic permanent magnet materials with better magnetic properties can still be prepared under rapid hot deformation rates, which is beneficial to improving the production efficiency. In some embodiments, the precursor flake nanocrystalline magnetic powder is prepared at the temperature of 710° C. to 740° C. for 5 min to 100 min, preferably 15 min to 60 min. In some embodiments, the flake nanocrystals inside the precursor flake nanocrystalline magnetic powder have an average grain size of 50 nm to 150 nm in a grain thickness direction and an average grain size of 150 nm to 600 nm in a grain length direction. In some embodiments, the flake nanocrystals have an average grain size of 60 nm to 100 nm in the grain thickness direction and an average grain size of 180 nm to 400 nm in the grain length direction. In some embodiments, a number of grains of flake nanocrystals inside the precursor flake nanocrystalline magnetic powder accounts for not less than 90%, preferably not less than 94%, and more preferably not less than 98% of a total number of grains inside the precursor flake nanocrystalline magnetic powder.

Step 2, orientation treatment by hot deformation: subjecting the precursor flake nanocrystalline magnetic powder or a package or a green body prepared from the precursor flake nanocrystalline magnetic powder to hot deformation at a temperature of 500° C. to 850° C., such that the flake nanocrystals are regularly arranged to obtain an oriented flake nanocrystalline rare earth permanent magnet material.

Specifically, the hot deformation in the orientation treatment by the hot deformation in step 2 is conducted by one or more selected from the group consisting of hot rolling deformation, hot pressing deformation, and hot extrusion deformation.

In some embodiments, the hot rolling deformation is conducted by subjecting the precursor flake nanocrystalline magnetic powder to the hot rolling deformation under vacuum or a protective atmosphere at a temperature of 600° C. to 850° C. with a deformation amount in a thickness direction of the precursor flake nanocrystalline magnetic powder of 50% to 90%, such that the flake nanocrystals are regularly arranged. In some embodiments, the hot rolling deformation is conducted at a temperature of 700° C. to 850° C., preferably 750° C. to 850° C. with a deformation amount in the thickness direction of the precursor flake nanocrystalline magnetic powder of 60% to 80%.

In some embodiments, the hot pressing deformation is conducted by subjecting the precursor flake nanocrystalline magnetic powder to vacuum packaging using a packaging material to obtain the package, and subjecting the package to the hot pressing deformation at a temperature of 600° C. to 850° C. with a deformation rate of 0.02 mm/s to 3.00 mm/s and a deformation amount of the package along a hot pressing direction of 50% to 90%, such that the flake nanocrystals are regularly arranged. In some embodiments, the packaging material is a plastic material, preferably a copper tube or stainless steel tube. In some embodiments, the hot pressing deformation is conducted at a temperature of 700° C. to 850° C., preferably 750° C. to 850° C. with a deformation rate of 0.02 mm/s to 1.00 mm/s or 1.00 mm/s to 3.00 mm/s, preferably 0.02 mm/s to 0.2 mm/s or 0.2 mm/s to 3.00 mm/s and a deformation amount of the package along a hot pressing direction of 60% to 80%.

In some embodiments, the hot pressing deformation is conducted by preparing the precursor flake nanocrystalline magnetic powder into a green body with a density of 65.0% to 99.9% at a temperature of room temperature to 800° C., and subjecting the green body to the hot pressing deformation at a temperature of 600° C. to 850° C. with a deformation rate of 0.02 mm/s to 3 mm/s and a deformation amount of the green body along a hot pressing direction of 50% to 90%, such that the flake nanocrystals are regularly arranged. In some embodiments, the hot pressing deformation is conducted at a temperature of 700° C. to 850° C., preferably 750° C. to 850° C. with a deformation rate of 0.02 mm/s to 1.00 mm/s or 1.00 mm/s to 3.00 mm/s, preferably 0.02 mm/s to 0.2 mm/s or 0.2 mm/s to 3.00 mm/s and a deformation amount of the green body along a hot pressing direction of 60% to 80%.

Step 3, post-processing for optimizing orientation: subjecting the oriented flake nanocrystalline rare earth permanent magnet material to heat preservation at a temperature of 600° C. to 850° C. for 3 min to 120 min under vacuum or a protective atmosphere to obtain the anisotropic flake nanocrystalline rare earth permanent magnet material.

The above-mentioned specific post-processing for optimizing orientation is beneficial to further growth of oriented grains, improves anisotropy, can optimize the distribution of rare earth-rich phases at grain boundaries to be uniform, and is beneficial to eliminating the residual stress caused by hot deformation and further improving the magnetic properties. In some embodiments, the heat preservation is conducted at a temperature of 750° C. to 850° C. for 5 min to 60 min.

The present disclosure further provides an anisotropic flake nanocrystalline rare earth permanent magnet material prepared by the above method for preparing an anisotropic flake nanocrystalline rare earth permanent magnet material. In some embodiments of the present disclosure, the rare earth permanent magnet material includes a powder material and a bulk material. In some embodiments, the powder material is a flake magnetic powder, and the flake magnetic powder shows shape anisotropy. Due to the anisotropy of the magnetic properties of the flake magnetic powder itself, the flake magnetic powder can be oriented by both stress field and magnetic field, and can also be oriented by stress field and magnetic field at the same time. This powder material can be adapted to different industrial scenarios when preparing magnets, and has broad application prospects. The bulk material has excellent magnetic properties and can be directly prepared into corresponding device shapes according to different application requirements, thus exhibiting broad application prospects.

In the anisotropic flake nanocrystalline rare earth permanent magnet material of the present disclosure, the flake nanocrystals inside the rare earth permanent magnet material are regularly arranged in a way that the thickness direction of the flake nanocrystals is parallel to the hot deformation direction. Since an easy magnetization direction of the nanocrystals is parallel to the thickness direction of the grains, the flake nanocrystalline rare earth material exhibits magnetic anisotropy. In the anisotropic flake nanocrystalline rare earth permanent magnet material, the anisotropic flake nanocrystals have an average grain size of 30 nm to 200 nm in a thickness direction and an average grain size of 150 nm to 800 nm in a length direction, showing excellent magnetic properties. In some embodiments, the anisotropic flake nanocrystals have an average grain size of 50 nm to 150 nm in a thickness direction and an average grain size of 200 nm to 600 nm in a length direction.

The present disclosure is further described below through specific examples.

Example 1

Figure 1B:
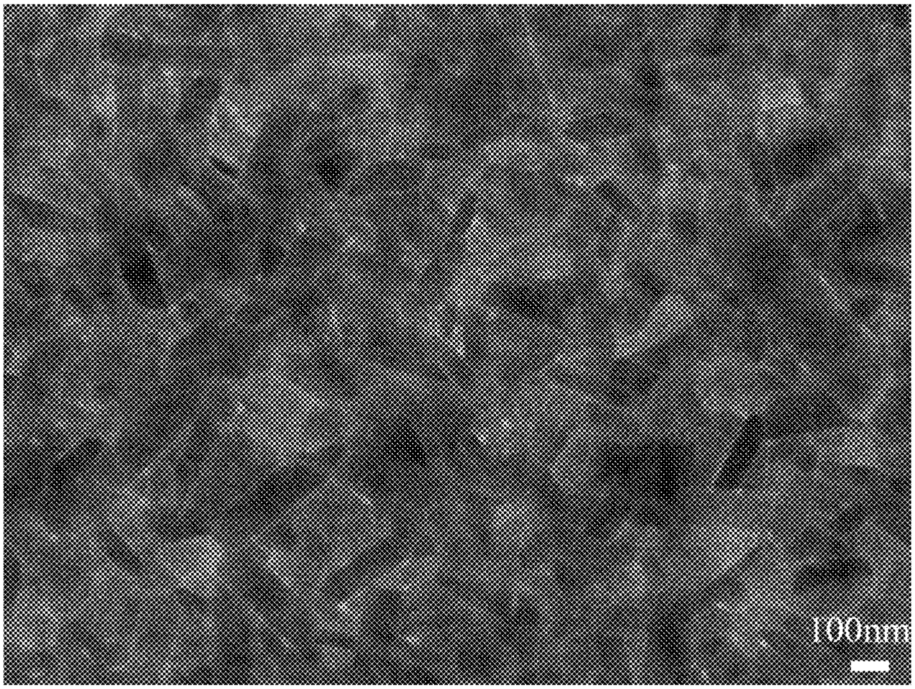
FIG. 1B shows an SEM image of the precursor flake nanocrystalline magnetic powder in Example 1 of the present disclosure.

This example provided a method for preparing an anisotropic flake nanocrystalline rare earth permanent magnet material, consisting of the following steps:

Step 1, preparation of a precursor flake nanocrystalline magnetic powder: an alloy ingot with a nominal composition of $Nd_{29.89}Fe_{62.62}Co_{5.93}Ga_{0.64}B_{0.92}$ (wt. %) was subjected to melt-spinning at a linear speed of a rapid-quenching roller of 25 m/s to obtain a nanocrystalline rapid-quenching magnetic powder with a particle size of 50 μm to 450 μm. The nanocrystalline rapid-quenching magnetic powder was an equiaxed crystal, as shown in FIG. 1A. Nano Measurer statistical software was used for measurement and statistics, and an average grain size of the equiaxed crystal was 50 nm. The nanocrystalline rapid-quenching magnetic powder was subjected to heat preservation at a temperature of 720° C. for 15 min under vacuum with a vacuum degree of $5\times10^{-3}$ Pa to obtain a precursor flake nanocrystalline magnetic powder, as shown in FIG. 1B. The precursor flake nanocrystalline magnetic powder had an average grain size of 71 nm in the grain thickness direction and an average grain size of 245 nm in the grain length direction. The number of grains of the flake nanocrystals inside the precursor flake nanocrystalline magnetic powder accounts for not less than 98.1% of a total number of grains inside the precursor flake nanocrystalline magnetic powder. At this time, the flake nanocrystals were randomly arranged; and since an easy magnetization direction of the flake nanocrystals was parallel to a thickness direction of the flake nanocrystals, the precursor flake nanocrystalline magnetic powder appeared isotropically.

Figure 1C:
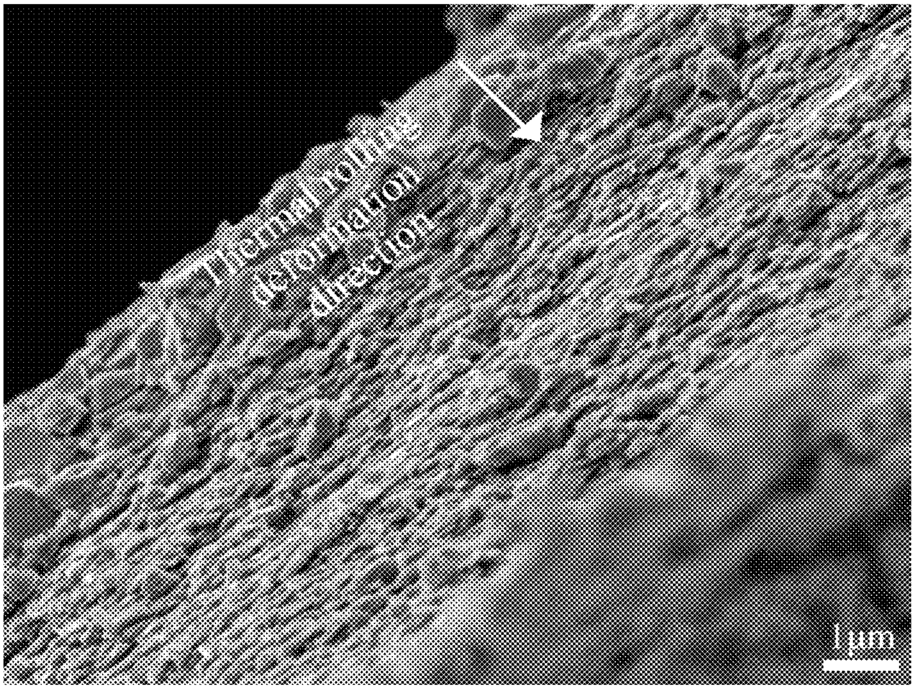
FIG. 1C shows an SEM image of the oriented flake nanocrystalline magnetic powder in Example 1 of the present disclosure.

Step 2, orientation treatment by hot deformation: the precursor flake nanocrystalline magnetic powder prepared in step 1 was subjected to hot rolling deformation using a double-roller mill at a temperature of 780° C. in an argon protective atmosphere. The deformation amount in a thickness direction of the magnetic powder after hot rolling deformation was 65%, as shown in FIG. 1C. After the hot rolling deformation, the flake nanocrystals inside the magnetic powder were regularly arranged in a way that a thickness direction of the flake nanocrystals was parallel to a hot rolling deformation direction, such that an oriented flake nanocrystalline magnetic powder was prepared.

Figure 1D:
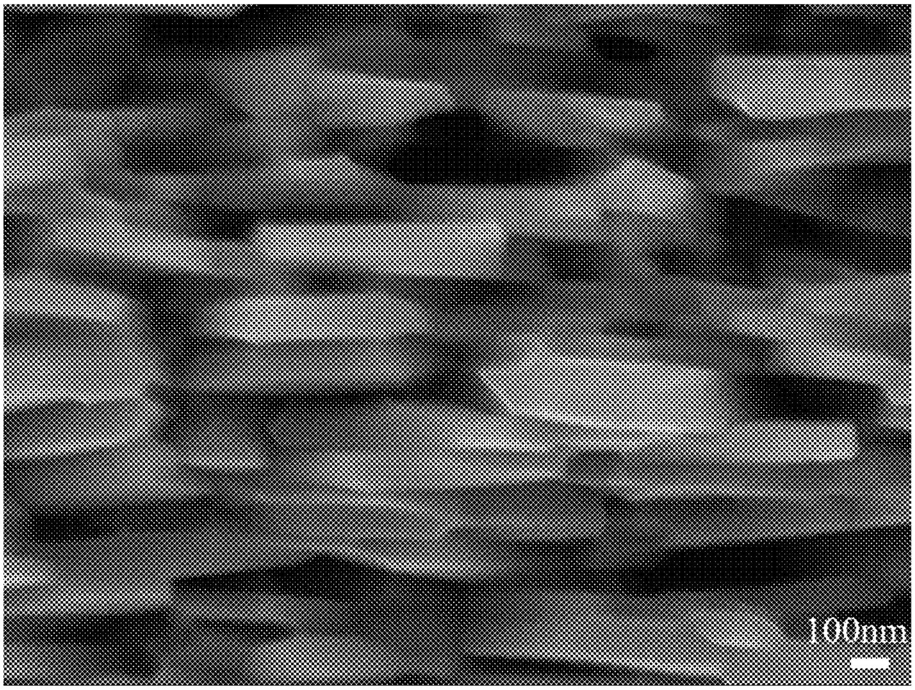
FIG. 1D shows an SEM image of the anisotropic flake nanocrystalline magnetic powder in Example 1 of the present disclosure.
Figure 2A:
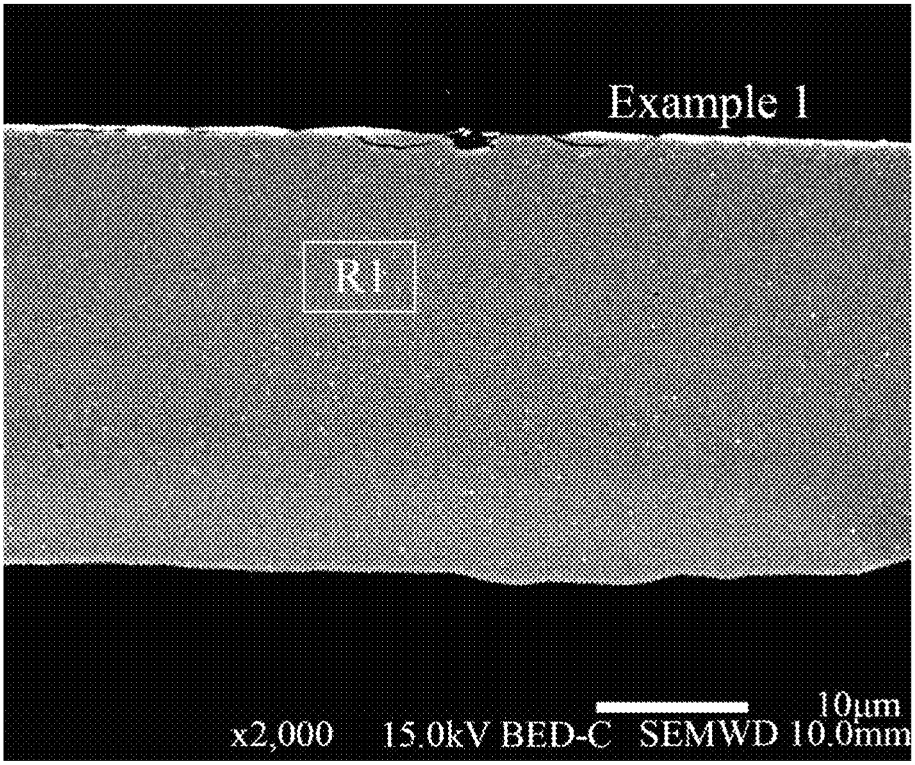
FIG. 2A shows an SEM image of the precursor flake nanocrystalline magnetic powder of Example 1.
Figure 2B:
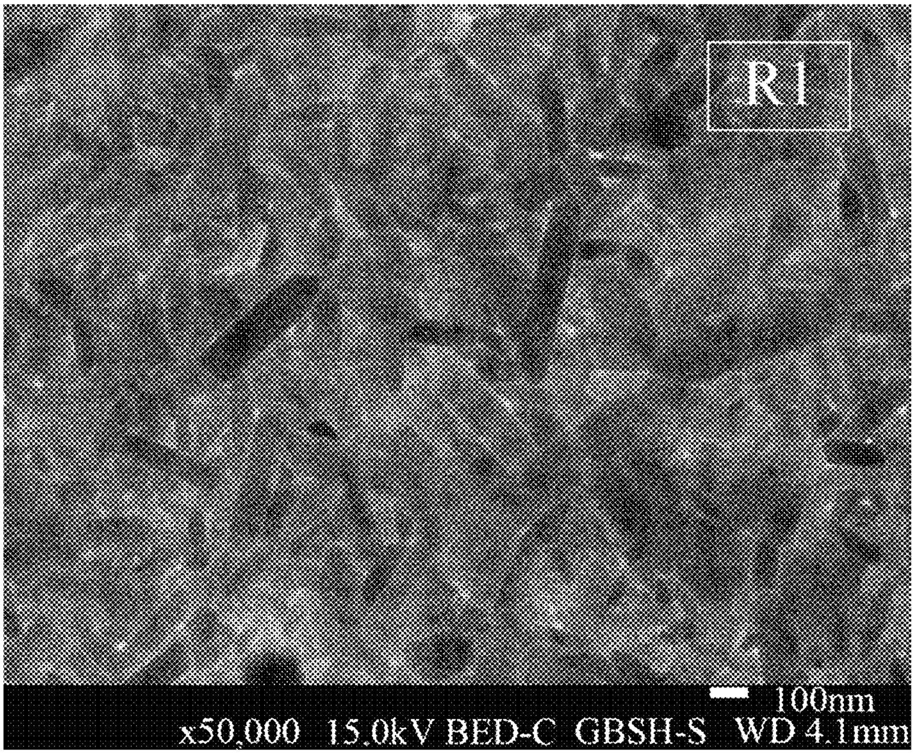
FIG. 2B shows an enlarged view of the R1 frame selection in FIG. 2A.
Figure 2C:
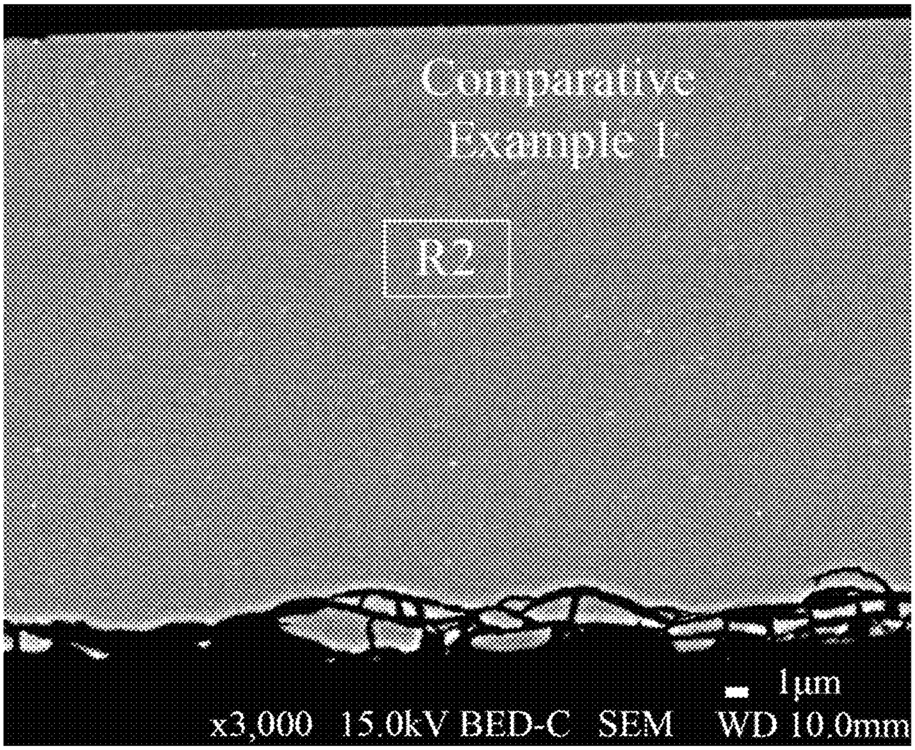
FIG. 2C shows an SEM image of the precursor flake nanocrystalline magnetic powder of Comparative Example 1.
Figure 2D:
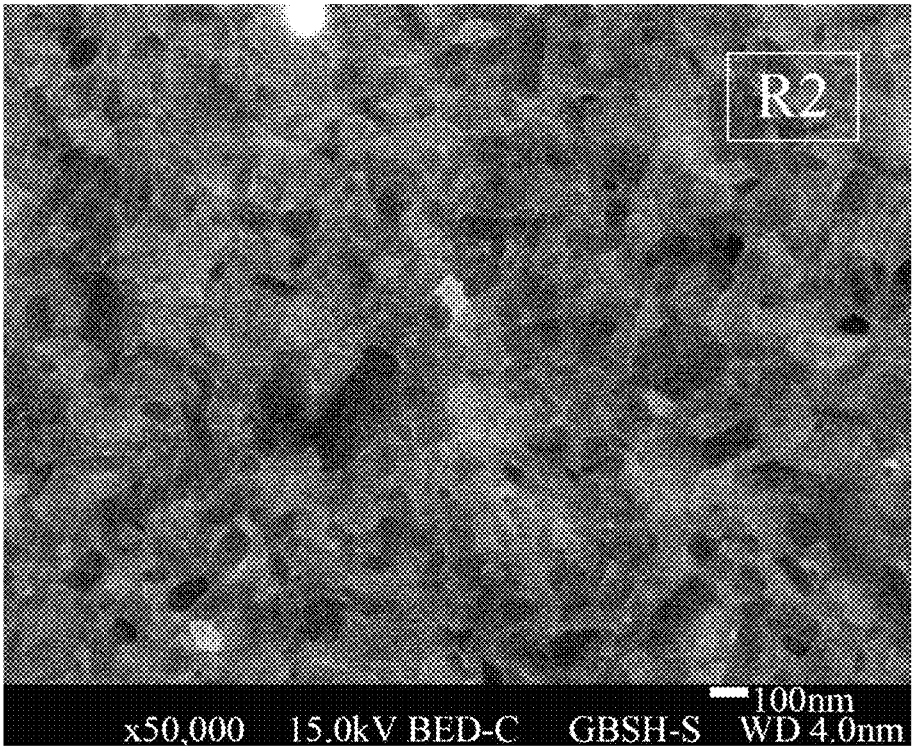
FIG. 2D shows an enlarged view of the R2 frame selection in FIG. 2C.
Figure 2E:
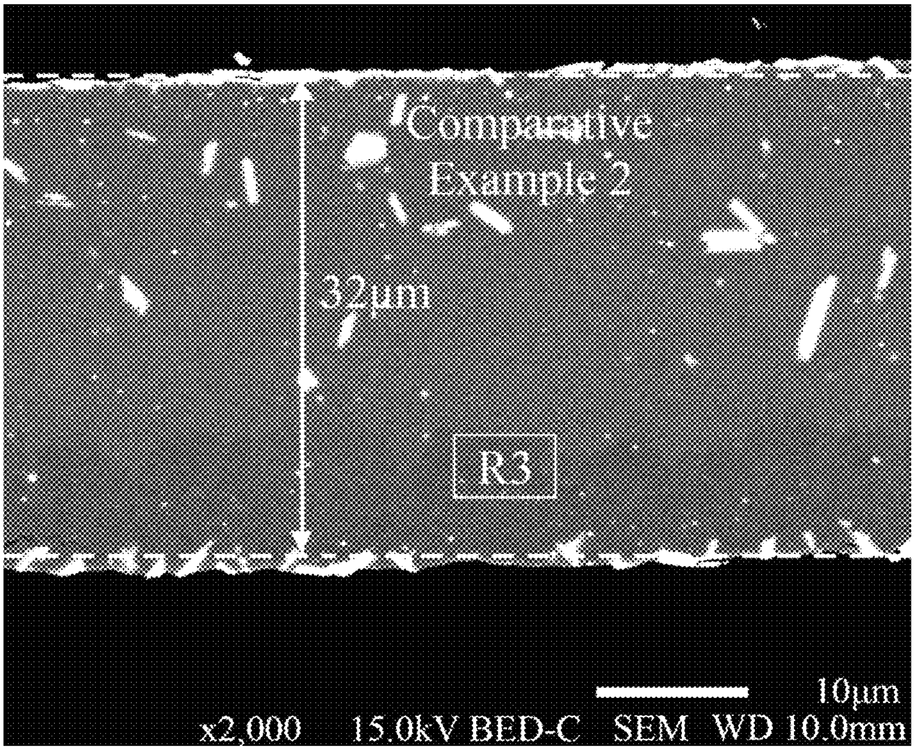
FIG. 2E shows an SEM image of the precursor flake nanocrystalline magnetic powder of Comparative Example 2.
Figure 2F:
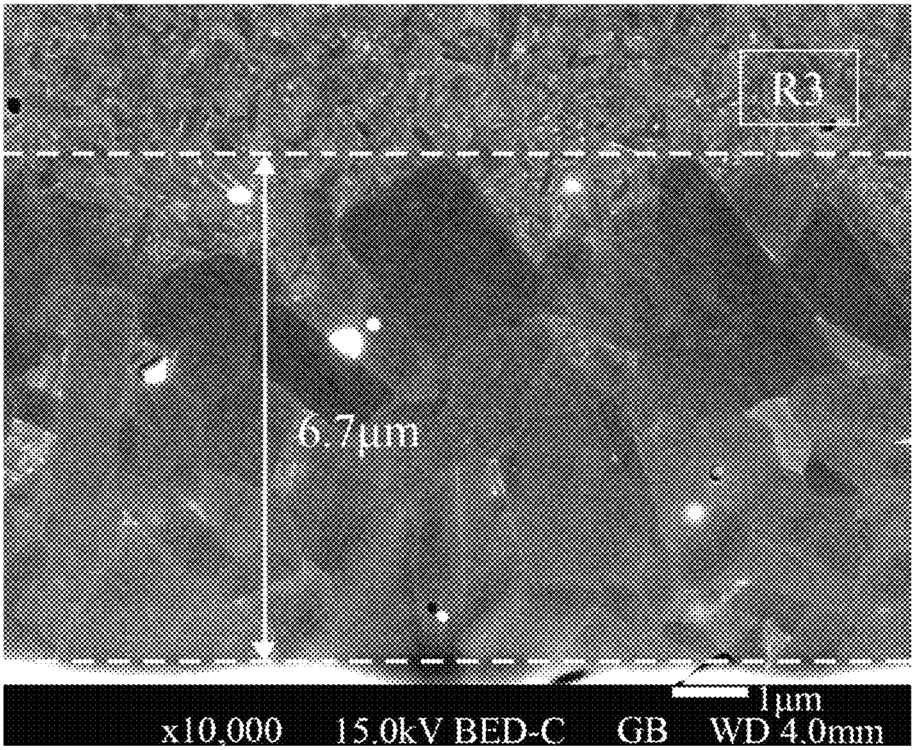
FIG. 2F shows an enlarged view of the R3 frame area in FIG. 2E.

Step 3, post-processing for optimizing orientation: the oriented flake nanocrystalline magnetic powder prepared in step 2 was subjected to heat preservation at a temperature of 800° C. for 5 min under vacuum with a vacuum degree of $1\times10^{-2}$ Pa. As shown in FIG. 1D, the oriented grains further grew, increasing the anisotropy and optimizing the distribution of the rare earth-rich phase at the grain boundaries to be uniform, and were conducive to the removal of residual stress. The anisotropic flake nanocrystalline magnetic powder was prepared, and the flake nanocrystal had an average grain size of 90 nm in the grain thickness direction and an average grain size of 305 nm in the grain length direction.

Comparative Example 1

Comparative Example 1 was different from Example 1 in that the nanocrystalline rapid-quenching magnetic powder obtained in the preparation of precursor flake nanocrystalline magnetic powder in step 1 of Example 1 was subjected to the heat preservation at a temperature of 700° C. for 20 min instead of at the temperature of 720° C. for 15 min, while the remaining preparation steps were the same as those in Example 1.

Comparative Example 2

Comparative Example 2 was different from Example 1 in that the nanocrystalline rapid-quenching magnetic powder obtained in the preparation of precursor flake nanocrystalline magnetic powder in step 1 of Example 1 was subjected to the heat preservation at the temperature of 750° C. for 30 min instead of at the temperature of 720° C. for 15 min, while the remaining preparation steps were the same as those in Example 1.

FIGS. 2A-2F show the micromorphology of the magnetic powders prepared from the preparation of precursor flake nanocrystalline magnetic powder in step 1 in Example 1 and Comparative Examples 1 and 2. As shown in FIGS. 2A-2F, the preparation of precursor flake nanocrystalline magnetic powder in step 1 in Comparative Example 1 was conducted at an excessively low heating temperature (700° C.), and the grain growth is inhibited. Some of the grains in the center area of the magnetic powder are still equiaxed. The number of grains of flake nanocrystals inside the precursor flake nanocrystalline magnetic powder accounts for not less than 50.5% of a total number of grains inside the precursor flake nanocrystalline magnetic powder, which was much lower than the proportion of the flake nanocrystals in Example 1. In addition, the flaky nanocrystals inside the magnetic powder of Comparative Example 1 have an average grain size of 49 nm in the thickness direction and an average grain size of 110 nm in the length direction, which are lower than the grain size of the flake nanocrystals of Example 1. Furthermore, the ratio of the grain size in the length direction to the grain size in the thickness direction was smaller than that in Example 1, and the shape anisotropy was inferior to that in Example 1. In the preparation of precursor flake nanocrystalline magnetic powder in step 2 in Comparative Example 2 was conducted at an excessively high heating temperature (750° C.). At an excessive high temperature, the grains on the side of the magnetic powder close to the roller were prone to abnormal growth to form coarse grains. The coarse grains have an average grain size of 1.6 μm, and the proportion of abnormally grown coarse grains reaches 22.1% (the ratio of the thickness of the coarse grains region to the total thickness of the magnetic powder). Meanwhile, the flake nanocrystals grown inside the magnetic powders have an average grain size in the thickness direction of 95 nm and an average grain size in the length direction of 320 nm.

Comparative Example 3

Comparative Example 3 was different from Example 1 in that the nanocrystalline rapid-quenching magnetic powder obtained in the preparation of precursor flake nanocrystalline magnetic powder in step 1 of Example 1 was not subjected to the heat preservation at the temperature of 720° C. for 15 min, while the remaining preparation steps were the same as those in Example 1.

Comparative Example 4

Comparative Example 4 was different from Example 1 in that the deformation amount in the thickness direction of the magnetic powder after the hot rolling deformation in the orientation treatment by hot deformation in step 2 of Example 1 was changed from 65% to 30%, while the remaining preparation steps were the same as those in Example 1.

The properties of the anisotropic magnetic powders prepared according to Example 1 and Comparative Examples 1 to 4 were measured using a vibrating sample magnetometer (VSM). The results are shown in Table 1.

TABLE 1

Magnetic properties of the anisotropic magnetic powders

| | $B_r$ (kGs) | $H_{cj}$ (kOe) | $(BH)_{max}$ (MGOe) |
|---|---|---|---|
| Example 1 | 14.1 | 13.2 | 45.7 |
| Comparative Example 1 | 13.3 | 13.7 | 41.1 |
| Comparative Example 2 | 13.0 | 11.5 | 37.2 |
| Comparative Example 3 | 13.1 | 14.1 | 40.3 |
| Comparative Example 4 | 11.1 | 13.9 | 26.3 |

The anisotropic magnetic powders prepared according to Example 1 and Comparative Examples 1 to 4 were separately mixed with 1 wt. % epoxy resin, and then molded at room temperature under the action of an orientation magnetic field of 3 T, obtaining an anisotropic bonded magnet with a diameter of φ10 mm and a density of 5.9 g/cm$^3$. The XRD pattern of the bonded magnet was tested, and the orientation degrees of the anisotropic magnetic powders prepared according to Example 1 and Comparative Examples 1 to 4 were characterized by a ratio of the diffraction peak intensity at (006) of the orientation surface of the anisotropic bonded magnet to the diffraction peak intensity at (105) of the orientation surface of the anisotropic bonded magnet, as shown in FIG. 3.

Figure 3:
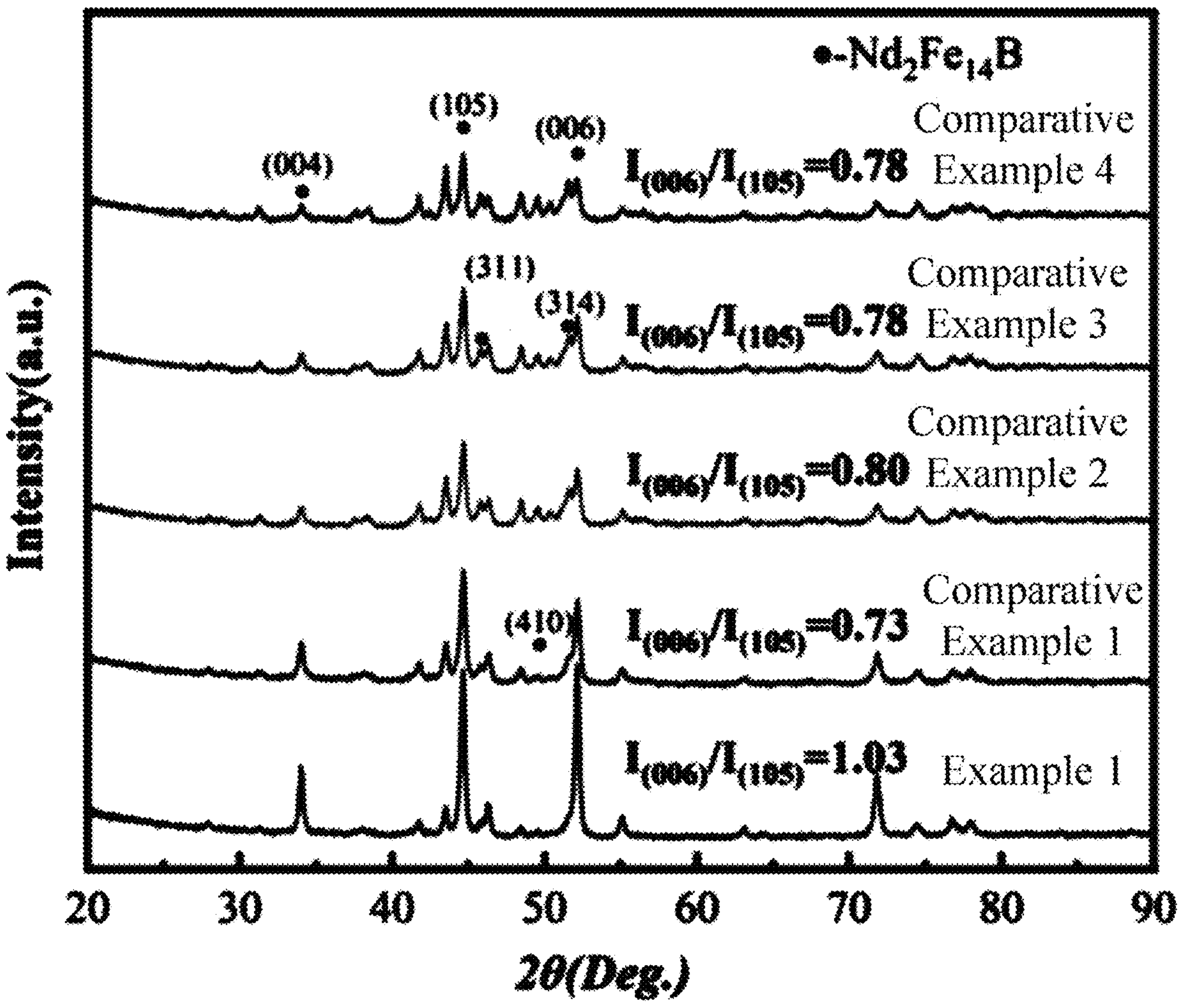
FIG. 3 shows X-ray diffraction (XRD) patterns of Example 1 and Comparative Examples 1 to 4.

As shown in Table 1 and FIG. 3, the orientation degree and magnetic properties of the anisotropic flake nanocrystalline magnetic powder of Example 1 are significantly better than those of Comparative Examples 1 to 4. The main reason is that rapid-quenching nanocrystalline magnetic powder in Example 1 is subjected to the preparation of an precursor flake nanocrystalline magnetic powder in step 1 to obtain the precursor flake nanocrystalline magnetic powder. The proportion of grains of the internal flake nanocrystal is high, and the flake nanocrystals have a high ratio of the grain size in length direction to the grain size in thickness direction, thus showing better shape anisotropy. This makes the flake nanocrystal prone to rotation under stress during the subsequent hot deformation. The flake nanocrystals are regularly arranged in the thickness direction along the direction of hot deformation (the direction pointed by the arrow in FIG. 1C), thus obtaining an excellent oriented texture with a better orientation degree.

In Comparative Example 1, since the proportion of flake nanocrystals is significantly lower than that in Example 1, the equiaxed crystals that did not form flake nanocrystals need to undergo a process of dissolution, precipitation, and orientation during hot deformation. The grains need a long orientation time, and thus are not fully oriented during the hot rolling deformation. The orientation degree of the prepared magnetic powder is obviously lower than that in Example 1, and the orientation degree is a key factor affecting the remanence. Correspondingly, the remanence and maximum energy product of Comparative Example 1 are significantly lower than those of Example 1.

In Comparative Example 2, after the magnetic powder underwent the preparation of precursor flake nanocrystalline magnetic powder in step 1, a large number of coarse crystals formed, which hindered the dissolution, precipitation, and orientation of the grains during subsequent hot deformation, making the orientation degree of Comparative Example 2 significantly lower than that in Example 1. Correspondingly, the remanence of Comparative Example 2 is significantly lower than that of Example 1. Moreover, the influence of coarse grain causes the coercivity of Comparative Example 2 to significantly decrease, resulting in the maximum energy product of Comparative Example 2 being significantly lower than that of Example 1.

In Comparative Example 3, since the rapid-quenching nanocrystalline magnetic powder is not subjected to heat preservation, the grains remain as fine equiaxed crystals, which are conducive to the dissolution and precipitation of the grains during the subsequent hot deformation to form finer grains, such that the coercivity is higher than that of Example 1. However, the equiaxed crystals could not be fully oriented during the hot deformation, and the orientation degree of Comparative Example 3 is significantly lower than that of Example 1. Correspondingly, the remanence and maximum energy product are also significantly lower than those in Example 1.

In Comparative Example 4, since the deformation amount of the magnetic powder prepared by the preparation of precursor flake nanocrystal magnetic powder of step 1 during the hot deformation is significantly lower than that in Example 1, the flake nanocrystals are not fully oriented during the hot deformation. Therefore, the orientation degree of Comparative Example 4 is significantly lower than that of Example 1, while the remanence and maximum energy product are significantly lower than those of Example 1.

Example 2

This example provided a method for preparing an anisotropic nanocrystalline rare earth permanent magnet material, consisting of the following steps:

Step 1, preparation of a precursor flake nanocrystalline magnetic powder: an alloy ingot with a nominal composition of $Pr_{2.1}Nd_{27.85}Fe_{62.56}Co_{5.93}Ga_{0.64}B_{0.92}$ (wt. %) was subjected to melt-spinning at a linear speed of a rapid-quenching roller of 35 m/s to obtain an amorphous rapid-quenching magnetic powder with a particle size of 50 μm to 450 μm. The amorphous rapid-quenching magnetic powder was subjected to heat preservation at a temperature of 730° C. for 20 min under vacuum with a vacuum degree of $5\times10^{-3}$ Pa to obtain a precursor flake nanocrystalline magnetic powder. Nano Measurer statistical software was adopted for measurement and statistics, and the precursor flake nanocrystalline magnetic powder had an average grain size of 90 nm in the grain thickness direction and an average grain size of 200 nm in the grain length direction. The number of grains of flake nanocrystals inside the precursor flake nanocrystalline magnetic powder accounts for not less than 91.5% of a total number of grains inside the precursor flake nanocrystalline magnetic powder. At this time, the flake nanocrystals were randomly arranged; and since an easy magnetization direction of the flake nanocrystals was parallel to a thickness direction of the flake nanocrystals, the precursor flake nanocrystalline magnetic powder appeared isotropically.

Step 2, orientation treatment by hot deformation: the precursor flake nanocrystalline magnetic powder prepared in step 1 was subjected to hot rolling deformation using a double-roller mill at a temperature of 780° C. in an argon protective atmosphere. The deformation in a thickness direction of the magnetic powder after the hot rolling deformation was 60%. After the hot rolling deformation, the flake nanocrystals inside the magnetic powder were regularly arranged in away that a thickness direction of the flake nanocrystals was arranged parallel to the hot deformation direction of the magnetic powder, such that an oriented flake nanocrystalline magnetic powder was prepared.

Step 3, post-processing for optimizing orientation: the oriented flake nanocrystalline magnetic powder prepared in step 2 was subjected to heat preservation at a temperature of 800° C. for 7 min under vacuum with a vacuum degree of $1\times10^{-2}$ Pa, which was conducive to further growth of the oriented grains, thus increasing the anisotropy, optimizing the distribution of the rare earth-rich phase at the grain boundaries to be uniform, and removing residual stress. The anisotropic flake nanocrystalline magnetic powder was prepared, and the flake nanocrystals had an average grain size of 103 nm in the grain thickness direction and an average grain size of 275 nm in the grain length direction.

Comparative Example 5

Comparative Example 5 was different from Example 2 in that the amorphous rapid-quenching magnetic powder obtained in the preparation of precursor flake nanocrystalline magnetic powder in step 1 of Example 2 was not subjected to the heat preservation at the temperature of 730° C. for 20 min, while the remaining preparation steps were the same as those in Example 2.

The properties of the anisotropic magnetic powders prepared according to Example 2 and Comparative Example 5 were measured using a VSM. The results are shown in Table 2.

TABLE 2

Magnetic properties of the anisotropic magnetic powders

| | $B_r$ (kGs) | $H_{cj}$ (kOe) | $(BH)_{max}$ (MGOe) |
|---|---|---|---|
| Example 2 | 13.2 | 14.4 | 42.2 |
| Comparative Example 5 | 7.9 | 16.3 | 15.3 |

The anisotropic magnetic powder prepared according to Example 2 was used to prepare an anisotropic bonded magnet using the same process conditions as those in Example 1. It was measured that the $Nd_2Fe_{14}B$ phase had a diffraction peak $I_{(006)}/I_{(105)}=0.75$, indicating that the flake nanocrystals of the anisotropic magnetic powder prepared according to Example 2 showed regular orientation. As shown in Table 2, the magnetic properties of the anisotropic flake nanocrystalline magnetic powder of Example 2 are significantly better than those of Comparative Example 5. The main reason is analyzed as that the precursor flake nanocrystalline magnetic powder in Example 2, prepared from the rapid-quenching nanocrystalline magnetic powder through the preparation of precursor flake nanocrystalline magnetic powder of step 1, has a relatively high number of internal flake nanocrystalline grains, and the grains could be fully oriented. While in Comparative Example 5, the amorphous rapid-quenching magnetic powder was directly subjected to hot deformation. In the process of hot deformation, the amorphous structure needs to be nucleated before the texture can be formed, which requires sufficient time. It can be seen from the magnetic properties of Comparative Example 5 that the amorphous rapid-quenching magnetic powder could not achieve an oriented texture directly through hot rolling deformation, and exhibits isotropy.

Example 3

This example provided a method for preparing an anisotropic nanocrystalline rare earth permanent magnet material, consisting of the following steps:

Step 1, preparation of a precursor flake nanocrystalline magnetic powder: an alloy ingot with a nominal composition of $Nd_{29.39}Ce_{0.5}Fe_{62.76}Co_{5.93}Ga_{0.5}B_{0.92}$ (wt. %) was mechanically crushed to obtain a crushed magnetic powder with a particle size of less than 1 mm. The crushed magnetic powder was subjected to ball milling in a planetary ball mill at room temperature using a stainless steel ball mill tank under argon protection with a rotation speed of 400 r/min and a ball-to-material ratio of 10:1 for 6 h, to obtain a ball-milled nanocrystalline magnetic powder with an average grain size of 30 nm. The ball-milled nanocrystalline magnetic powder was subjected to heat preservation at a temperature of 710° C. for 30 min under vacuum with a vacuum degree of $5\times10^{-3}$ Pa to obtain the precursor flake nanocrystalline magnetic powder. Nano Measurer statistical software was adopted for measurement and statistics, and the precursor flake nanocrystalline magnetic powder had an average grain size of 75 nm in the grain thickness direction and an average grain size of 240 nm in the grain length direction. The number of grains of flake nanocrystals inside the precursor flake nanocrystalline magnetic powder accounts for not less than 92.5% of a total number of grains inside the precursor flake nanocrystalline magnetic powder. At this time, the flake nanocrystals were randomly arranged; and since an easy magnetization direction of the flake nanocrystals was parallel to a thickness direction of the flake nanocrystal, the precursor flake nanocrystalline magnetic powder appeared isotropically.

Step 2, orientation treatment by hot deformation: the precursor flake nanocrystalline magnetic powder prepared in step 1 was subjected to hot rolling deformation using a double-roller mill at a temperature of 800° C. in an argon protective atmosphere. The deformation in a thickness direction of the magnetic powder after the hot rolling deformation was 65%. After the hot rolling deformation, the flake nanocrystals inside the magnetic powder were regularly arranged in a way that a thickness direction of the flake nanocrystals was parallel to the hot deformation direction, such that an oriented flake nanocrystalline magnetic powder was prepared.

Step 3, post-processing for optimizing orientation: the oriented flake nanocrystalline magnetic powder prepared in step 2 was subjected to heat preservation at a temperature of 820° C. for 10 min under vacuum with a vacuum degree of $1\times10^{-2}$ Pa, which was conducive to the further growth of the oriented grains, increasing the anisotropy and optimizing the distribution of the rare earth-rich phase at the grain boundaries to be uniform. The anisotropic flake nanocrystalline magnetic powder was prepared, and the flake nanocrystals had an average grain size of 91 nm in the grain thickness direction and an average grain size of 295 nm in the grain length direction.

Comparative Example 6

Comparative Example 6 was different from Example 3 in that the ball-milled nanocrystalline magnetic powder obtained in the preparation of precursor flake nanocrystalline magnetic powder of step 1 in Example 3 was not subjected to the heat preservation at the temperature of 710° C. for 30 min, while the remaining preparation steps were the same as those in Example 3.

The properties of the anisotropic magnetic powders prepared according to Example 3 and Comparative Example 6 were measured using a VSM. The results are shown in Table 3.

TABLE 3

Magnetic properties of the anisotropic magnetic powders

| | $B_r$ (kGs) | $H_{cj}$ (kOe) | $(BH)_{max}$ (MGOe) |
|---|---|---|---|
| Example 3 | 12.9 | 11.2 | 36.5 |
| Comparative Example 6 | 12.1 | 11.9 | 32.1 |

The anisotropic magnetic powders prepared according to Example 3 and Comparative Example 6 were separately used to prepare an anisotropic bonded magnet using the same process conditions as those in Example 1. It was measured that the $Nd_2Fe_{14}B$ phase of Example 3 has a diffraction peak $I_{(006)}/I_{(105)}$=0.77, while the $Nd_2Fe_{14}B$ phase of Comparative Example 6 has a diffraction peak $I_{(006)}/I_{(105)}$=0.75, indicating that the flake nanocrystal of the anisotropic magnetic powder prepared according to Example 3 shows regular orientation, and has an orientation degree better than that of Comparative Example 6. As shown in Table 3, the magnetic properties of the anisotropic flake nanocrystalline magnetic powder of Example 3 are significantly better than those of Comparative Example 6. The main reason is analyzed as that the precursor flake nanocrystalline magnetic powder of Example 3, prepared from the ball-milled nanocrystalline magnetic powder through the preparation of precursor flake nanocrystalline magnetic powder of step 1, has a relatively high number of internal flake nanocrystalline grains, which was beneficial to the grain orientation of the anisotropic magnetic powder. Since a-Fe impurities are inevitably introduced during the ball milling using stainless steel ball milling tank, the magnetic properties of the anisotropic flake nanocrystalline magnetic powder in Example 3 are lower than those of the anisotropic flake nanocrystalline magnetic powder in Example 1.

Example 4

Figure 4A:
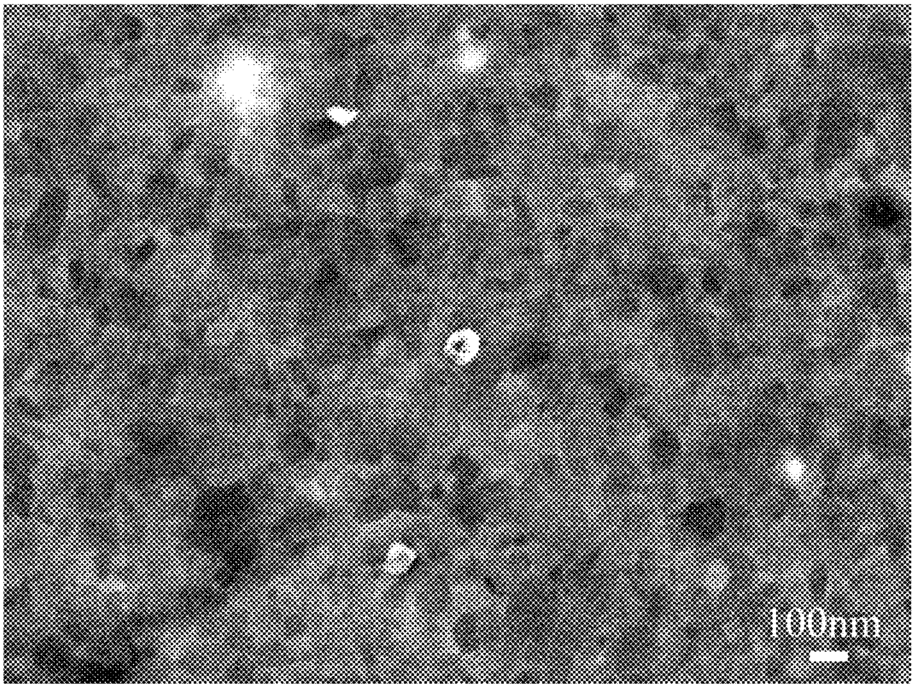
FIG. 4A shows an SEM image of the nanocrystalline rapid-quenching magnetic powder in Example 4 of the present disclosure.
Figure 4B:
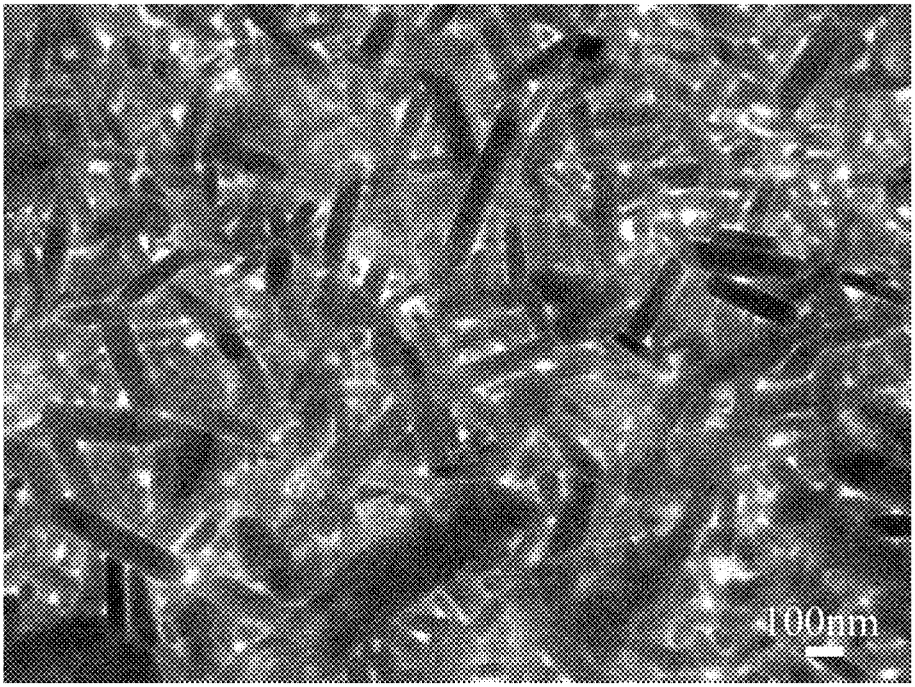
FIG. 4B shows an SEM image of the precursor flake nanocrystalline magnetic powder in Example 4 of the present disclosure.

This example provided a method for preparing an anisotropic nanocrystalline rare earth permanent magnet material, consisting of the following steps:

Step 1, preparation of a precursor flake nanocrystalline magnetic powder: an alloy ingot with a nominal composition of $Nd_{29.89}Fe_{62.62}Co_{5.93}Ga_{0.64}B_{0.92}$ (wt. %) was subjected to melt-spinning at a linear speed of a rapid-quenching roller of 25 m/s to obtain a nanocrystalline rapid-quenching magnetic powder with a particle size of 50 μm to 450 μm. The nanocrystalline rapid-quenching magnetic powder was an equiaxed crystal, as shown in FIG. 4A. Nano Measurer statistical software was adopted for measurement and statistics, and an average grain size of the equiaxed crystal was 50 nm. The nanocrystalline rapid-quenching magnetic powder was subjected to heat preservation at a temperature of 730° C. for 30 min under vacuum with a vacuum degree of $5\times10^{-3}$ Pa to obtain the precursor flake nanocrystalline magnetic powder, as shown in FIG. 4B. The precursor flake nanocrystalline magnetic powder had an average grain size of 85 nm in the grain thickness direction and an average grain size of 280 nm in the grain length direction. The number of grains of flake nanocrystals inside the precursor flake nanocrystalline magnetic powder accounts for not less than 98.5% of a total number of grains inside the precursor flake nanocrystalline magnetic powder. At this time, the flake nanocrystal was randomly arranged; and since an easy magnetization direction of the flake nanocrystals was parallel to a thickness direction of the flake nanocrystals, the precursor flake nanocrystalline magnetic powder appeared isotropically.

Figure 4C:
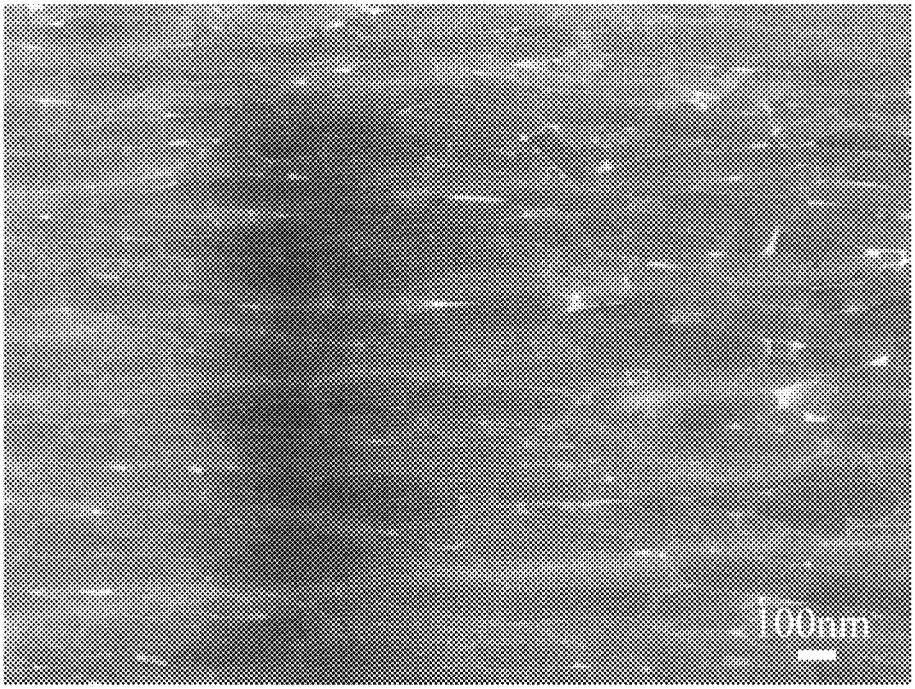
FIG. 4C shows an SEM image of the oriented flake nanocrystalline magnetic powder in Example 4 of the present disclosure.

Step 2, orientation treatment by hot deformation: the precursor flake nanocrystalline magnetic powder prepared in step 1 was subjected to hot pressing-hot deformation in a vacuum induction hot-pressed sintering furnace with a vacuum degree of $1\times10^{-2}$ Pa at 650° C. under 200 MPa for 1 min to obtain a hot-pressed green body with a density of 99%. The hot-pressed green body was subjected to hot deformation at a temperature of 780° C. with a hot deformation rate of 0.86 mm/s and a deformation amount in the height direction of 70% to obtain a hot deformation-based magnet, as shown in FIG. 4C. The flake nanocrystals inside the hot deformation-based magnetic powder were regularly arranged in a way that a thickness direction of the flake nanocrystals was parallel to a hot deformation direction, such that an oriented flake nanocrystalline magnet.

Figure 4D:
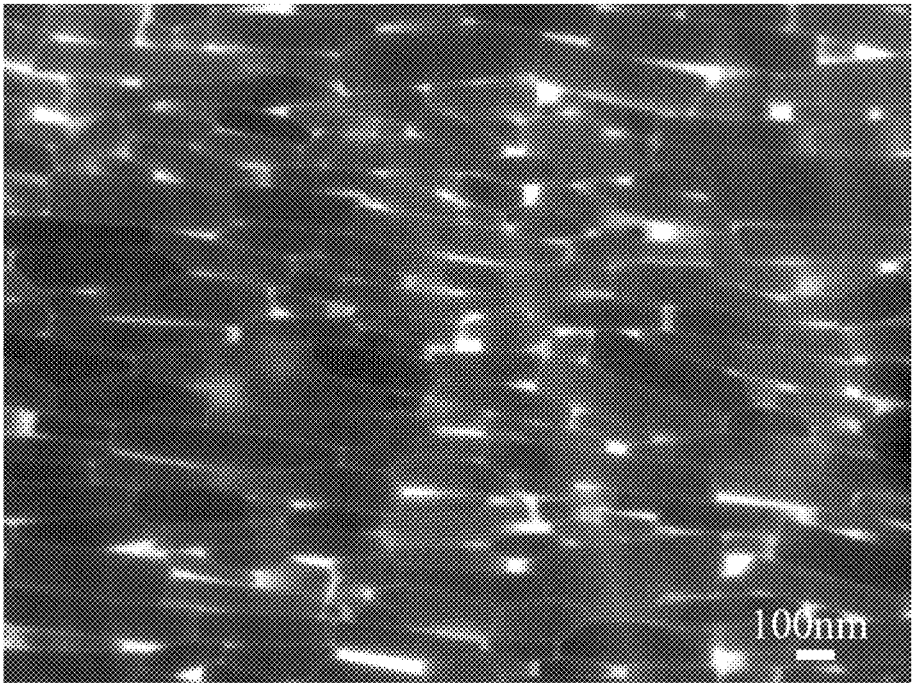
FIG. 4D shows an SEM image of the anisotropic flake nanocrystalline magnetic powder in Example 4 of the present disclosure.
Figure 5:
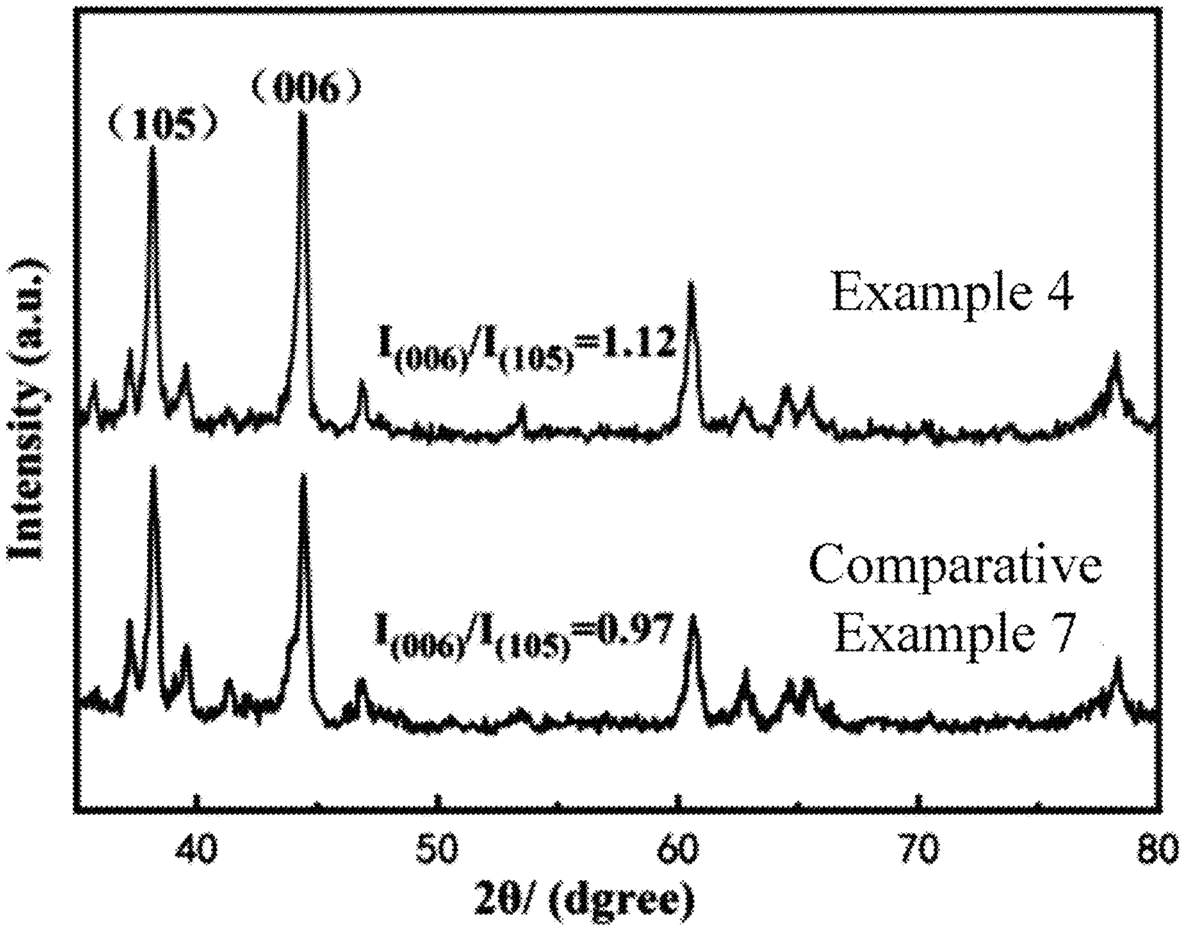
FIG. 5 shows XRD patterns of Example 4 and Comparative Example 7.

Step 3, post-processing for optimizing orientation: the oriented flake nanocrystalline magnet prepared in step 2 was subjected to heat preservation at a temperature of 800° C. for 5 min under vacuum with a vacuum degree of $1\times10^{-2}$ Pa, which was conducive to the further growth of oriented grains, increasing the anisotropy and could optimize the distribution of the rare earth-rich phase at the grain boundaries to be uniform, and removing residual stress. As shown in FIG. 4D, the anisotropic flake nanocrystalline magnet was prepared, and the flake nanocrystals have an average grain size of 98 nm in the grain thickness direction and an average grain size of 320 nm in the grain length direction.

Comparative Example 7

Comparative Example 7 was different from Example 4 in that the nanocrystalline rapid-quenching magnetic powder obtained in the preparation of precursor flake nanocrystalline magnetic powder of step 1 in Example 4 was not subjected to the heat preservation at the temperature of 730° C. for 30 min, while the remaining preparation steps were the same as those in Example 4.

The properties of the anisotropic magnets prepared according to Example 4 and Comparative Example 7 were measured using a VSM. The results are shown in Table 4.

TABLE 4

Magnetic properties of the anisotropic magnets

| | $B_r$ (kGs) | $H_{cj}$ (kOe) | $(BH)_{max}$ (MGOe) |
|---|---|---|---|
| Example 4 | 14.2 | 13.8 | 47.1 |
| Comparative Example 7 | 13.2 | 14.3 | 41.3 |

FIGS. 4A-4D showed the XRD patterns of the anisotropic magnets of Example 4 and Comparative Example 7. It was measured that the $Nd_2Fe_{14}B$ phase of Example 4 had a diffraction peak $I_{(006)}/I_{(105)}$=1.12, while the $Nd_2Fe_{14}B$ phase of Comparative Example 7 had a diffraction peak $I_{(006)}/I_{(105)}$=0.97, indicating that the flake nanocrystals of the anisotropic magnet prepared according to Example 4 showed regular orientation, with an orientation degree better than that of Comparative Example 7. As shown in Table 4, the magnetic properties of the anisotropic flake nanocrystalline magnet of Example 4 are significantly better than those of Comparative Example 7. The main reason is analyzed as that the precursor flake nanocrystalline magnetic powder of Example 4, prepared from the rapid-quenching nanocrystalline magnetic powder through the preparation of precursor flake nanocrystalline magnetic powder of step 1, has a relatively high number of internal flake nanocrystalline grains, which was beneficial to the grain orientation of anisotropic magnet. Due to the rotational orientation of the flake nanocrystals under the stress field, the anisotropic magnet could still achieve excellent oriented texture under the rapid deformation of 0.86 mm/s.

Example 5

Example 5 was different from Example 4 in that the hot deformation rate in the orientation treatment by hot deformation of step 2 was 0.1 mm/s in Example 5 instead of 0.86 mm/s in Example 4, while the remaining preparation steps were the same as those in Example 4. The flake nanocrystals of the anisotropic magnet prepared in Example 5 had an average grain size of 101 nm in the thickness direction and an average grain size of 330 nm in the length direction.

Comparative Example 8

Comparative Example 8 was different from Example 5 in that the nanocrystalline rapid-quenching magnetic powder obtained in the preparation of precursor flake nanocrystalline magnetic powder of step 1 of Example 5 was not subjected to the heat preservation at the temperature of 730° C. for 30 min in Comparative Example 8, while the remaining preparation steps were the same as those in Example 5.

The properties of the anisotropic magnets prepared according to Example 5 and Comparative Example 8 were measured using a VSM. The results are shown in Table 5.

TABLE 5

Magnetic properties of the anisotropic magnets

| | $B_r$ (kGs) | $H_{cj}$ (kOe) | $(BH)_{max}$ (MGOe) |
|---|---|---|---|
| Example 5 | 14.4 | 12.8 | 48.1 |
| Comparative Example 8 | 13.7 | 13.3 | 41.3 |

Through the same test method as in Example 4, it was measured that the $Nd_2Fe_{14}B$ phase of Example 5 has a diffraction peak $I_{(006)}/I_{(105)}$=1.21, while the $Nd_2Fe_{14}B$ phase of Comparative Example 8 has a diffraction peak $I_{(006)}/I_{(105)}$=1.05, indicating that the flake nanocrystals of the anisotropic magnetic powder prepared according to Example 5 show regular orientation, and has an orientation degree better than that of Comparative Example 8. As shown in Table 5, the magnetic properties of the anisotropic flake nanocrystalline magnet of Example 5 are significantly better than those of Comparative Example 8. The main reason is analyzed as that the precursor flake nanocrystalline magnetic powder of Example 5, prepared from the rapid-quenching nanocrystalline magnetic powder prepared through the preparation of precursor flake nanocrystalline magnetic powder of step 1, has a high number of internal flake nanocrystalline grains, which was beneficial to the grain orientation of the anisotropic magnet. Combining Example 4 and Example 5, it can be seen taht the deformation rate in Example 5 is lower, which is more conducive to the rotational orientation of the flake nanocrystals during the hot deformation to obtain a more excellent oriented texture.

Example 6

This example provided a method for preparing an anisotropic nanocrystalline rare earth permanent magnet material, consisting of the following steps:

Step 1, preparation of a precursor flake nanocrystalline magnetic powder: an alloy ingot with a nominal composition of $Nd_{29.89}Fe_{62.52}Co_{5.93}Ga_{0.64}Nb_{0.1}B_{0.92}$ (wt. %) was subjected to melt-spinning at a linear speed of a rapid-quenching roller of 25 m/s to obtain a nanocrystalline rapid-quenching magnetic powder with a particle size of 50 μm to 450 μm. The nanocrystalline rapid-quenching magnetic powder was an equiaxed crystal, with an average grain size of 50 nm. The nanocrystalline rapid-quenching magnetic powder was subjected to heat preservation at a temperature of 740°

C. for 60 min under vacuum with a vacuum degree of $5\times10^{-3}$ Pa to obtain a precursor flake nanocrystalline magnetic powder. The precursor flake nanocrystalline magnetic powder had an average grain size of 92 nm in the grain thickness direction and an average grain size of 270 nm in the grain length direction. The number of grains of flake nanocrystals inside the precursor flake nanocrystalline magnetic powder accounts for not less than 94.7% of a total number of grains inside the precursor flake nanocrystalline magnetic powder. At this time, the flake nanocrystal was randomly arranged; and since an easy magnetization direction of the flake nanocrystals was parallel to a thickness direction of the flake nanocrystal, the precursor flake nanocrystalline magnetic powder appeared isotropically.

Step 2, orientation treatment by hot deformation: the precursor flake nanocrystalline magnetic powder prepared in step 1 was vacuum-packaged in a copper tube with an inner diameter of 15 mm and a wall thickness of 2 mm under a vacuum degree of $1\times10^{-2}$ Pa to obtain a package with a height of 25 mm. The package was subjected to hot deformation using a vacuum induction hot-pressed sintering furnace at a temperature of 780° C. with a hot deformation rate of 0.80 mm/s and a deformation amount in a height direction of the package of 90% to obtain an oriented flake nanocrystalline magnet.

Step 3, post-processing for optimizing orientation: the oriented flake nanocrystalline magnet prepared in step 2 was removed from the copper tube, subjected to heat preservation at a temperature of 800° C. for 10 min under vacuum with a vacuum degree of $1\times10^{-2}$ Pa, which is conducive to the further growth of the oriented grains, increasing the anisotropy, optimizing the distribution of the rare earth-rich phase at the grain boundaries to be uniform, and removing residual stress. The anisotropic flake nanocrystalline magnet was prepared, and the flake nanocrystals had an average grain size of 103 nm in the grain thickness direction and an average grain size of 295 nm in the grain length direction.

Comparative Example 9

Comparative Example 9 was different from Example 6 in that the nanocrystalline rapid-quenching magnetic powder obtained in the preparation of precursor flake nanocrystalline magnetic powder of step 1 of Example 6 was not subjected to the heat preservation at the temperature of 740° C. for 60 min, while the remaining preparation steps were the same as those in Example 6.

The properties of the anisotropic magnets prepared according to Example 6 and Comparative Example 9 were measured using a VSM. The results are shown in Table 6.

TABLE 6

Magnetic properties of the anisotropic magnets

| | $B_r$ (kGs) | $H_{cj}$ (kOe) | $(BH)_{max}$ (MGOe) |
|---|---|---|---|
| Example 6 | 13.9 | 13.5 | 45.2 |
| Comparative Example 9 | 13.2 | 14.3 | 41.3 |

Through the same test method as in Example 4, it was measured that the $Nd_2Fe_{14}B$ phase of Example 6 had a diffraction peak $I_{(006)}/I_{(105)}=1.08$, while the $Nd_2Fe_{14}B$ phase of Comparative Example 9 had a diffraction peak $I_{(006)}/I_{(105)}=1.02$, indicating that the flake nanocrystal of the anisotropic magnet prepared according to Example 6 showed regular orientation, and had an orientation degree better than that of Comparative Example 9. As shown in Table 6, the magnetic properties of the anisotropic flake nanocrystalline magnet of Example 6 are significantly better than those of Comparative Example 9. The main reason is analyzed as that the precursor flake nanocrystalline magnetic powder of Example 6, prepared from the rapid-quenching nanocrystalline magnetic powder of step 1, has a relatively high number of internal flake nanocrystalline grains, which is beneficial to the grain orientation of the anisotropic magnet. Due to the rotational orientation of the flake nanocrystals under the stress field, the anisotropic magnet could still achieve excellent oriented texture under the rapid deformation of 0.80 mm/s.

Example 7

This example provided a method for preparing an anisotropic nanocrystalline rare earth permanent magnet material, consisting of the following steps:

Step 1, preparation of a precursor flake nanocrystalline magnetic powder: an alloy ingot with a nominal composition of $Nd_{29.89}Fe_{62.52}Co_{5.93}Ga_{0.64}Nb_{0.1}B_{0.92}$ (wt. %) was subjected to melt-spinning at a linear speed of a rapid-quenching roller of 25 m/s to obtain a nanocrystalline rapid-quenching magnetic powder with a particle size of 50 μm to 450 μm. The nanocrystalline rapid-quenching magnetic powder was an equiaxed crystal, with an average grain size of 50 nm. The nanocrystalline rapid-quenching magnetic powder was subjected to heat preservation at a temperature of 740° C. for 60 min under vacuum with a vacuum degree of $5\times10^{-3}$ Pa to obtain a precursor flake nanocrystalline magnetic powder. The precursor flake nanocrystalline magnetic powder had an average grain size of 92 nm in the grain thickness direction and an average grain size of 270 nm in the grain length direction. The number of grains of flake nanocrystals inside the precursor flake nanocrystalline magnetic powder accounts for not less than 94.7% of a total number of grains inside the precursor flake nanocrystalline magnetic powder. At this time, the flake nanocrystal was randomly arranged; and since an easy magnetization direction of the flake nanocrystal was parallel to a thickness direction of the flake nanocrystal, the precursor flake nanocrystalline magnetic powder appeared isotropically.

Step 2, orientation treatment by hot deformation: the precursor flake nanocrystalline magnetic powder prepared in step 1 was cold-pressed and densified at room temperature to obtain a green body with a density of 60%. The package was subjected to hot extrusion deformation using a vacuum induction hot-pressed sintering furnace at a temperature of 790° C. with a hot extrusion deformation rate of 0.70 mm/s to obtain an oriented flake nanocrystalline magnetic ring with an outer diameter of 30 mm and a wall thickness of 1.5 mm.

Step 3, post-processing for optimizing orientation: the oriented flake nanocrystalline magnetic ring prepared in step 2 was subjected to heat preservation at a temperature of 800° C. for 10 min under vacuum with a vacuum degree of $1\times10^{-2}$ Pa, which was conducive to the further growth of the oriented grains, increasing the anisotropy, optimizing the distribution of the rare earth-rich phase at the grain boundaries to be uniform, and removing residual stress. The anisotropic flake nanocrystalline magnetic ring was prepared, and the flake nanocrystals had an average grain size of 102 nm in the grain thickness direction and an average grain size of 285 nm in the grain length direction.

Comparative Example 10

Comparative Example 10 was different from Example 7 in that the nanocrystalline rapid-quenching magnetic powder obtained in the preparation of precursor flake nanocrystalline magnetic powder of step 1 of Example 7 was not subjected to the heat preservation at the temperature of 740° C. for 60 min, while the remaining preparation steps were the same as those in Example 7.

The properties of the anisotropic magnetic rings prepared according to Example 7 and Comparative Example 10 were measured using a VSM. The results are shown in Table 7.

TABLE 7

Magnetic properties of the anisotropic magnetic rings

| | $B_r$ (kGs) | $H_{cj}$ (kOe) | $(BH)_{max}$ (MGOe) |
|---|---|---|---|
| Example 7 | 13.8 | 13.7 | 43.2 |
| Comparative Example 10 | 13.2 | 14.5 | 41.0 |

Through the same test method as in Example 4, it was measured that the $Nd_2Fe_{14}B$ phase of the orientation plane of Example 7 had a diffraction peak $I_{(006)}/I_{(105)}=1.07$, while the $Nd_2Fe_{14}B$ phase the orientation plane of Comparative Example 9 had a diffraction peak $I_{(006)}/I_{(105)}=1.02$, indicating that the flake nanocrystals of the anisotropic magnet prepared according to Example 7 showed regular orientation, and had an orientation degree better than that of Comparative Example 10. As shown in Table 7, the magnetic properties of the anisotropic flake nanocrystalline magnet of Example 7 are significantly better than those of Comparative Example 10. The main reason is analyzed as the precursor flake nanocrystalline magnetic powder of Example 7, prepared from the rapid-quenching nanocrystalline magnetic powder through the preparation of precursor flake nanocrystalline magnetic powder of step 1, has a relatively high number of internal flake nanocrystalline grains, which was beneficial to the grain orientation of anisotropic magnet. Due to the rotational orientation of the flake nanocrystals under the stress field, the anisotropic magnetic ring could still achieve excellent oriented texture under the rapid deformation of 0.70 mm/s.

It should be understood that those of ordinary skill in the art can make improvements or transformations based on the above description, and all these improvements and transformations should fall within the scope of the appended claims of the present disclosure.

What is claimed is:

1. A method for preparing an anisotropic flake nanocrystalline rare earth permanent magnet material, wherein the method comprises the following steps:

step 1, preparation of a precursor flake nanocrystalline magnetic powder: subjecting a magnetic powder of a rare earth permanent magnet to heat preservation at a temperature of 710° C. to 740° C. for 15 minutes to 60 minutes under vacuum or a protective atmosphere to obtain the precursor flake nanocrystalline magnetic powder, wherein the magnetic powder of the rare earth permanent magnet is RE-Fe—B permanent magnet material, the magnetic powder of the rare earth permanent magnet is one selected from the group consisting of a nanocrystalline magnetic powder and an amorphous magnetic powder, and the nanocrystalline magnetic powder has an average grain size of not more than 200 nm; a number of grains of flake nanocrystals inside the precursor flake nanocrystalline magnetic powder accounts for not less than 85% of a total number of grains inside the precursor flake nanocrystalline magnetic powder, and the flake nanocrystals have an average grain size of 60 nm to 100 nm in a grain thickness direction and an average grain size of 180 nm to 400 nm in a grain length direction;

step 2, orientation treatment by hot deformation: subjecting the precursor flake nanocrystalline magnetic powder or a package or a green body prepared from the precursor flake nanocrystalline magnetic powder to hot deformation at a temperature of 500° C. to 850° C., such that the flake nanocrystals are regularly arranged to obtain an oriented flake nanocrystalline rare earth permanent magnet material; and step 3, post-processing for optimizing orientation: subjecting the oriented flake nanocrystalline rare earth permanent magnet material to heat preservation at a temperature of 600° C. to 850° C. for 3 minutes to 120 minutes under vacuum or a protective atmosphere to obtain the anisotropic flake nanocrystalline rare earth permanent magnet material.

2. The method for preparing the anisotropic flake nanocrystalline rare earth permanent magnet material of claim 1, wherein the magnetic powder of the rare earth permanent magnet has a nominal composition of $RE_xFe_{100-x-y-z}TM_yB_z$, wherein RE is one or more selected from the group consisting of La, Ce, Pr, Nd, Y, Dy, and Tb, TM is one or more selected from the group consisting of Co, Zr, Cr, V, Nb, Si, Ti, Mo, Mn, W, Ga, Cu, Al, and Zn, and x, y, and z each represent a mass fraction of an element, and $26.0 \leq x \leq 36.0$, $0.14 \leq y \leq 8.0$, and $0.8 \leq z \leq 1.36$.

3. The method for preparing the anisotropic flake nanocrystalline rare earth permanent magnet material of claim 2, wherein the hot deformation in the orientation treatment by the hot deformation in step 2 is conducted by one or more selected from the group consisting of hot rolling deformation, hot pressing deformation, and hot extrusion deformation.

4. The method for preparing the anisotropic flake nanocrystalline rare earth permanent magnet material of claim 1, wherein the hot deformation in the orientation treatment by the hot deformation in step 2 is conducted by one or more selected from the group consisting of hot rolling deformation, hot pressing deformation, and hot extrusion deformation.

5. The method for preparing the anisotropic flake nanocrystalline rare earth permanent magnet material of claim 4, wherein the hot rolling deformation is conducted by subjecting the precursor flake nanocrystalline magnetic powder to the hot rolling deformation under vacuum or a protective atmosphere at a temperature of 600° C. to 850° C. with a deformation amount of 50% to 90% in a thickness direction of the precursor flake nanocrystalline magnetic powder, such that the flake nanocrystals are regularly arranged.

6. The method for preparing the anisotropic flake nanocrystalline rare earth permanent magnet material of claim 4, wherein the hot pressing deformation is conducted by vacuum packaging the precursor flake nanocrystalline magnetic powder with a packaging material to obtain the package, and subjecting the package to the hot pressing deformation at a temperature of 600° C. to 850° C. with a deformation rate of 0.02 mm/s to 3 mm/s and a deformation amount of the package of 50% to 90% in a hot pressing direction, such that the flake nanocrystals are regularly arranged.

7. The method for preparing the anisotropic flake nanocrystalline rare earth permanent magnet material of claim 4, wherein the hot pressing deformation is conducted by preparing the precursor flake nanocrystalline magnetic powder into a green body with a density of 65.0% to 99.9% at a temperature of room temperature to 800° C., and subjecting the green body to the hot pressing deformation at a temperature of 600° C. to 850° C. with a deformation rate of 0.02 mm/s to 3 mm/s and a deformation amount of the green body of 50% to 90% in a hot pressing direction, such that the flake nanocrystals are regularly arranged.

8. The method for preparing the anisotropic flake nanocrystalline rare earth permanent magnet material of claim 4, wherein the hot extrusion deformation is conducted by preparing the precursor flake nanocrystalline magnetic powder into a green body with a density of 65.0% to 99.9% at a temperature of room temperature to 800° C., and subjecting the green body to the hot extrusion deformation at a temperature of 600° C. to 850° C. with a deformation rate of 0.02 mm/s to 3 mm/s, such that the flake nanocrystals are regularly arranged.

9. A method for preparing an anisotropic flake nanocrystalline rare earth permanent magnet material, wherein the method comprises the following steps:

step 1, preparation of a precursor flake nanocrystalline magnetic powder: subjecting a magnetic powder of a rare earth permanent magnet to heat preservation at a temperature of 710° C. to 740° C. for 5 minutes to 120 minutes under vacuum or a protective atmosphere to obtain the precursor flake nanocrystalline magnetic powder, wherein the magnetic powder of the rare earth permanent magnet is RE-Fe—B permanent magnet material, the magnetic powder of the rare earth permanent magnet is one selected from the group consisting of a nanocrystalline magnetic powder and an amorphous magnetic powder, and the nanocrystalline magnetic powder has an average grain size of not more than 200 nm; a number of grains of flake nanocrystals inside the precursor flake nanocrystalline magnetic powder accounts for not less than 85% of a total number of grains inside the precursor flake nanocrystalline magnetic powder, and the flake nanocrystals have an average grain size of 10 nm to 300 nm in a grain thickness direction and an average grain size of 30 nm to 800 nm in a grain length direction;

step 2, orientation treatment by hot deformation: subjecting the precursor flake nanocrystalline magnetic powder or a package or a green body prepared from the precursor flake nanocrystalline magnetic powder to hot deformation at a temperature of 500° C. to 850° C., such that the flake nanocrystals are regularly arranged to obtain an oriented flake nanocrystalline rare earth permanent magnet material; and step 3, post-processing for optimizing orientation: subjecting the oriented flake nanocrystalline rare earth permanent magnet material to heat preservation at a temperature of 600° C. to 850° C. for 3 minutes to 120 minutes under vacuum or a protective atmosphere to obtain the anisotropic flake nanocrystalline rare earth permanent magnet material, wherein the hot deformation in the orientation treatment by the hot deformation in step 2 is conducted by hot pressing deformation, and the hot pressing deformation is conducted by vacuum packaging the precursor flake nanocrystalline magnetic powder with a packaging material to obtain the package, and subjecting the package to the hot pressing deformation at a temperature of 600° C. to 850° C. with a deformation rate of 0.02 mm/s to 3 mm/s and a deformation amount of the package of 50% to 90% in a hot pressing direction, such that the flake nanocrystals are regularly arranged.

10. A method for preparing an anisotropic flake nanocrystalline rare earth permanent magnet material, wherein the method comprises the following steps:

step 1, preparation of a precursor flake nanocrystalline magnetic powder: subjecting a magnetic powder of a rare earth permanent magnet to heat preservation at a temperature of 710° C. to 740° C. for 5 minutes to 120 minutes under vacuum or a protective atmosphere to obtain the precursor flake nanocrystalline magnetic powder, wherein the magnetic powder of the rare earth permanent magnet is RE-Fe—B permanent magnet material, the magnetic powder of the rare earth permanent magnet is one selected from the group consisting of a nanocrystalline magnetic powder and an amorphous magnetic powder, and the nanocrystalline magnetic powder has an average grain size of not more than 200 nm; a number of grains of flake nanocrystals inside the precursor flake nanocrystalline magnetic powder accounts for not less than 85% of a total number of grains inside the precursor flake nanocrystalline magnetic powder, and the flake nanocrystals have an average grain size of 10 nm to 300 nm in a grain thickness direction and an average grain size of 30 nm to 800 nm in a grain length direction;

step 2, orientation treatment by hot deformation: subjecting the precursor flake nanocrystalline magnetic powder or a package or a green body prepared from the precursor flake nanocrystalline magnetic powder to hot deformation at a temperature of 500° C. to 850° C., such that the flake nanocrystals are regularly arranged to obtain an oriented flake nanocrystalline rare earth permanent magnet material; and step 3, post-processing for optimizing orientation: subjecting the oriented flake nanocrystalline rare earth permanent magnet material to heat preservation at a temperature of 600° C. to 850° C. for 3 minutes to 120 minutes under vacuum or a protective atmosphere to obtain the anisotropic flake nanocrystalline rare earth permanent magnet material, wherein the hot deformation in the orientation treatment by the hot deformation in step 2 is conducted by hot pressing deformation, and the hot pressing deformation is conducted by preparing the precursor flake nanocrystalline magnetic powder into a green body with a density of 65.0% to 99.9% at a temperature of room temperature to 800° C., and subjecting the green body to the hot pressing deformation at a temperature of 600° C. to 850° C. with a deformation rate of 0.02 mm/s to 3 mm/s and a deformation amount of the green body of 50% to 90% in a hot pressing direction, such that the flake nanocrystals are regularly arranged.

11. A method for preparing an anisotropic flake nanocrystalline rare earth permanent magnet material, wherein the method comprises the following steps:

step 1, preparation of a precursor flake nanocrystalline magnetic powder: subjecting a magnetic powder of a rare earth permanent magnet to heat preservation at a temperature of 710° C. to 740° C. for 5 minutes to 120 minutes under vacuum or a protective atmosphere to obtain the precursor flake nanocrystalline magnetic powder, wherein the magnetic powder of the rare earth permanent magnet is RE-Fe—B permanent magnet material, the magnetic powder of the rare earth permanent magnet is one selected from the group consisting of a nanocrystalline magnetic powder and an amorphous magnetic powder, and the nanocrystalline magnetic powder has an average grain size of not more than 200 nm; a number of grains of flake nanocrystals inside the precursor flake nanocrystalline magnetic powder accounts for not less than 85% of a total number of grains inside the precursor flake nanocrystalline magnetic powder, and the flake nanocrystals have an average grain size of 10 nm to 300 nm in a grain thickness direction and an average grain size of 30 nm to 800 nm in a grain length direction;

step 2, orientation treatment by hot deformation: subjecting the precursor flake nanocrystalline magnetic powder or a package or a green body prepared from the precursor flake nanocrystalline magnetic powder to hot deformation at a temperature of 500° C. to 850° C., such that the flake nanocrystals are regularly arranged to obtain an oriented flake nanocrystalline rare earth permanent magnet material; and step 3, post-processing for optimizing orientation: subjecting the oriented flake nanocrystalline rare earth permanent magnet material to heat preservation at a temperature of 600° C. to 850° C. for 3 minutes to 120 minutes under vacuum or a protective atmosphere to obtain the anisotropic flake nanocrystalline rare earth permanent magnet material, wherein the hot deformation in the orientation treatment by the hot deformation in step 2 is conducted by hot extrusion deformation, and the hot extrusion deformation is conducted by preparing the precursor flake nanocrystalline magnetic powder into a green body with a density of 65.0% to 99.9% at a temperature of room temperature to 800° C., and subjecting the green body to the hot extrusion deformation at a temperature of 600° C. to 850° C. with a deformation rate of 0.02 mm/s to 3 mm/s, such that the flake nanocrystals are regularly arranged.

* * * * *